(12) United States Patent
Kroening et al.

(10) Patent No.: US 11,964,844 B2
(45) Date of Patent: Apr. 23, 2024

(54) FISH TAPE CASE

(71) Applicant: Greenlee Tools, Inc., Rockford, IL (US)

(72) Inventors: John Wayne Kroening, Machesney Park, IL (US); James Donald Schmidt, Rockford, IL (US); Greg Sassi, Island Lake, IL (US); John Hagan, Roscoe, IL (US)

(73) Assignee: GREENLEE TOOLS, INC., Rockford, IL (US)

( * ) Notice: Subject to any disclaimer, the term of this patent is extended or adjusted under 35 U.S.C. 154(b) by 0 days.

(21) Appl. No.: 17/753,404

(22) PCT Filed: Sep. 11, 2020

(86) PCT No.: PCT/US2020/050341
§ 371 (c)(1),
(2) Date: Mar. 2, 2022

(87) PCT Pub. No.: WO2021/050834
PCT Pub. Date: Mar. 18, 2021

(65) Prior Publication Data
US 2022/0289519 A1    Sep. 15, 2022

Related U.S. Application Data

(60) Provisional application No. 62/930,144, filed on Nov. 4, 2019, provisional application No. 62/899,374, filed on Sep. 12, 2019.

(51) Int. Cl.
*B65H 75/36* (2006.01)
*H02G 1/08* (2006.01)

(52) U.S. Cl.
CPC .......... *B65H 75/364* (2013.01); *H02G 1/083* (2013.01); *B65H 2701/376* (2013.01)

(58) Field of Classification Search
CPC ....... B65H 75/364; H02G 1/085; H02G 1/083
See application file for complete search history.

(56) References Cited

U.S. PATENT DOCUMENTS

| 2,689,709 A | 9/1954 | Waldschmidt |
| 3,067,984 A | 12/1962 | Linden |

(Continued)

FOREIGN PATENT DOCUMENTS

| CN | 101161578 A | 4/2008 |
| CN | 201230171 Y | 4/2009 |
| CN | 108886244 A | 11/2018 |

OTHER PUBLICATIONS

International Search Report for International Application No. PCT/US2020/050341 dated Dec. 21, 2020 (7 pages).

(Continued)

*Primary Examiner* — Seahee Hong
(74) *Attorney, Agent, or Firm* — Klintworth & Rozenblat IP LLP

(57) ABSTRACT

A fish tape case is configured to house a fish tape. The fish tape includes a shell having an upper base wall, a lower base wall, an inner side wall extending between inner perimeters of the base walls and forming a central aperture through the shell, an outer side wall extending between outer perimeters of the base walls and defining an outer diameter of the shell, the walls defining a cavity therein, the upper base wall having a first opening therethrough in communication with the cavity through which the fish tape can exit, and the outer side wall having a second opening therethrough in communication with the cavity through which the fish tape can exit. A storage reel is mounted in the cavity for holding the fish tape.

20 Claims, 25 Drawing Sheets

(56) References Cited

U.S. PATENT DOCUMENTS

| | | | | |
|---|---|---|---|---|
| 3,355,123 | A | * | 11/1967 | Schinske ................ H02G 1/085 242/396.5 |
| 3,424,435 | A | * | 1/1969 | Niemann ............... H02G 1/085 206/405 |
| 3,582,044 | A | * | 6/1971 | Gardner ................ H02G 11/02 254/134.3 FT |
| 3,601,330 | A | | 8/1971 | Minobe |
| 5,056,731 | A | * | 10/1991 | Koehn ................. B65H 75/364 242/407 |
| 5,106,056 | A | | 4/1992 | Crates et al. |
| 5,110,092 | A | * | 5/1992 | Blaha ................... H02G 1/083 254/134.3 FT |
| 5,201,495 | A | | 4/1993 | Crates et al. |
| D336,581 | S | * | 6/1993 | Parker ........................... D6/518 |
| 5,280,861 | A | | 1/1994 | Corriveau |
| D351,561 | S | | 10/1994 | Moffatt |
| 5,423,516 | A | * | 6/1995 | Blaha .................. B65H 75/406 254/134.3 FT |
| 5,649,674 | A | | 7/1997 | Cielker |
| D396,012 | S | | 7/1998 | Walsten |
| D408,749 | S | | 4/1999 | Walsten |
| 6,152,395 | A | * | 11/2000 | Corriveau ........... B65H 75/406 242/388.6 |
| D474,397 | S | | 5/2003 | Plummer |
| 6,722,603 | B1 | | 4/2004 | Atencio |
| 6,896,242 | B1 | * | 5/2005 | Konen .................. H02G 1/085 254/134.3 FT |
| 7,100,900 | B2 | | 9/2006 | Radle et al. |
| 8,651,459 | B2 | | 2/2014 | Axon et al. |
| 8,770,438 | B2 | * | 7/2014 | Cahill ................... E05B 75/005 221/281 |
| 9,417,054 | B2 | | 8/2016 | Moffatt et al. |
| 2006/0065883 | A1 | * | 3/2006 | Radle ..................... H02G 11/02 254/134.3 FT |
| 2007/0272905 | A1 | | 11/2007 | Ziebart et al. |
| 2009/0289139 | A1 | * | 11/2009 | Tsai .................. B65H 75/4402 242/397 |
| 2011/0133142 | A1 | | 6/2011 | Axon et al. |
| 2011/0155839 | A1 | | 6/2011 | Wells |
| 2017/0013343 | A1 | | 1/2017 | Tomlinson |
| 2019/0292005 | A1 | | 9/2019 | Miller et al. |

OTHER PUBLICATIONS

Written Opinion for International Application No. PCT/US2020/050341 dated Dec. 21, 2020, 4 pages.
Partial Supplementary European Search Report for European Application No. 20862397.5-1201 dated Sep. 26, 2023, 16 pages.
Official Action for Chinese Application No. 202080061206.9, dated Dec. 27, 2023, 20 pages.
Extened European Search Report for European Application No. 20862397 .5, dated Jan. 4, 2024, 15 pages.

* cited by examiner

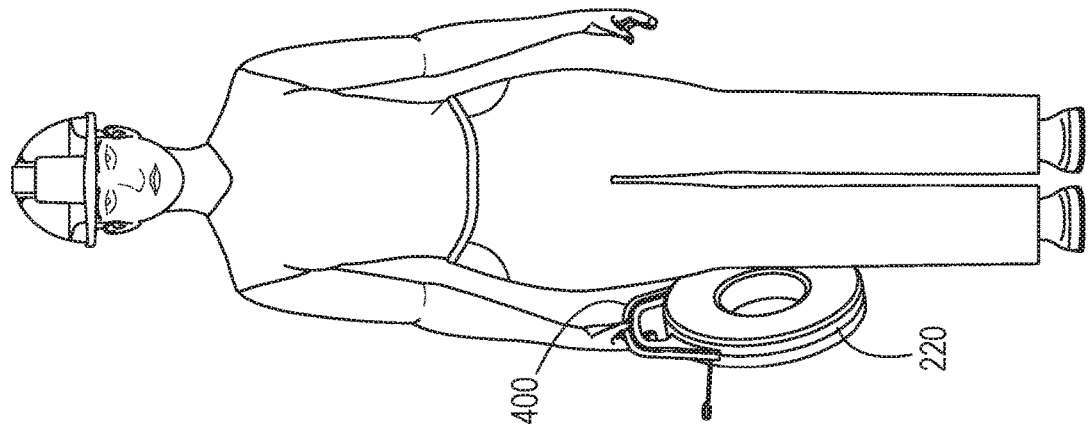
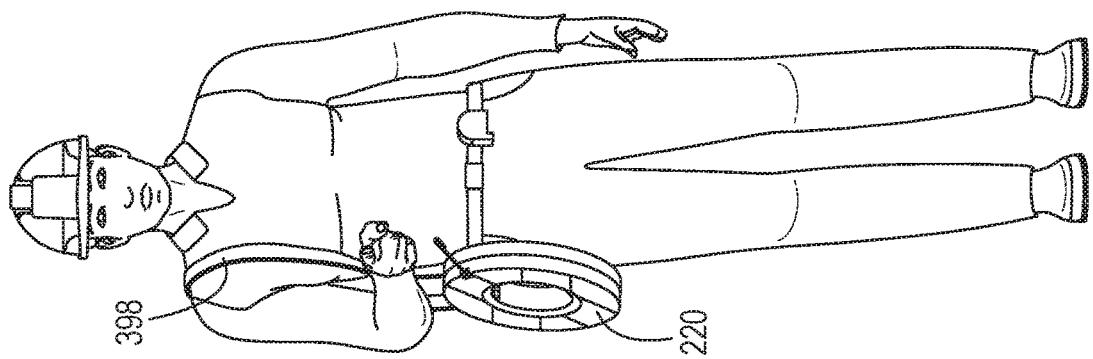
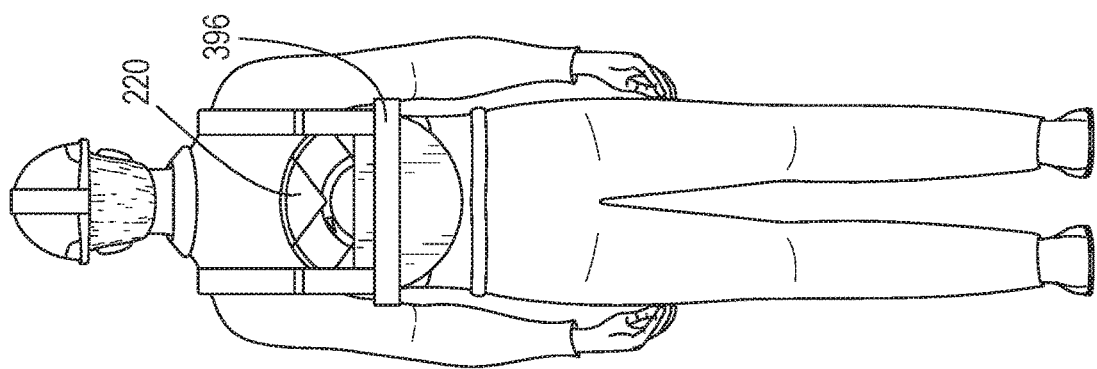
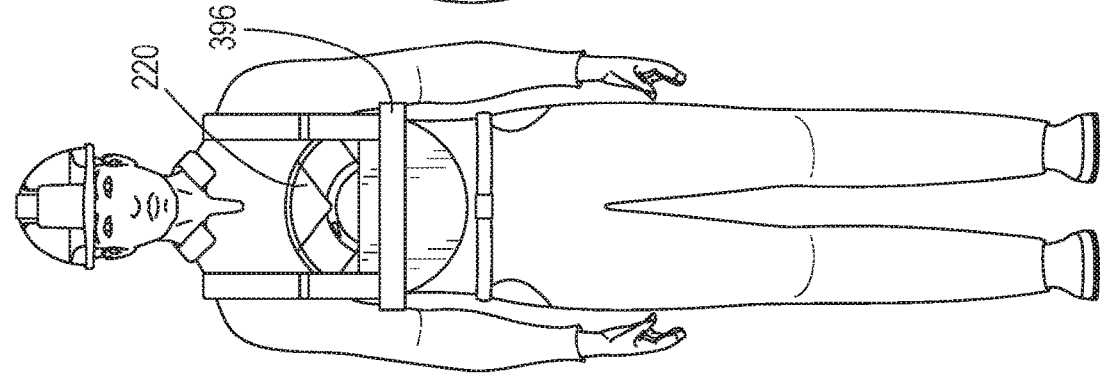

FISH TAPE CASE

RELATED APPLICATIONS

This application is a 35 U.S.C. 371 application based upon PCT/US2020/050341 filed on Sep. 11, 2020, and claims the domestic priority of U.S. provisional application Ser. No. 62/899,374 filed on Sep. 12, 2019 and U.S. provisional application Ser. No. 62/930,144 filed on Nov. 4, 2019, the contents of which are incorporated herein by reference.

FIELD OF THE DISCLOSURE

The present disclosure relates to a fish tape case.

BACKGROUND

Many structures utilize electrical wire and various types of cables to provide electricity, communications, and the like. These wires and cables are frequently installed in conduits, such as plastic or metal tubes, often installed into the walls, ceiling, and floors of a building while the building is being constructed, and wires and cables are then installed into the conduits after the framework of the building is sufficiently complete.

Typically, a fish tape is threaded through the conduit so as to extend out of both ends of the conduit. The fish tape is then used to pull a heavier line through the conduit. A wire is then attached to an end of the fish tape and the fish tape is used to pull the wire through the conduit. There are many different designs for fish tape cases currently on the market.

SUMMARY

A fish tape case in accordance with example embodiments is provided.

In an example, a fish tape case is configured to house a fish tape. The fish tape includes a shell having an upper base wall, a lower base wall, an inner side wall extending between inner perimeters of the base walls and forming a central aperture through the shell, an outer side wall extending between outer perimeters of the base walls and defining an outer diameter of the shell, the walls defining a cavity therein, the upper base wall having a first opening therethrough in communication with the cavity through which the fish tape can exit, and the outer side wall having a second opening therethrough in communication with the cavity through which the fish tape can exit.

In another example, a fish tape case is configured to house a fish tape. The fish tape case includes a shell having storage reel therein. The shell has an upper base wall, a lower base wall, an inner side wall extending between inner perimeters of the base walls and forming a central aperture through the shell, an outer side wall extending between outer perimeters of the base walls and defining an outer diameter of the shell, the walls defining a cavity therein, the upper base wall having a first opening therethrough in communication with the cavity through which the fish tape can exit, and the outer side wall having a second opening therethrough in communication with the cavity through which the fish tape can exit, a recess in a lower surface of the upper base wall which faces the cavity of the shell, the recess being in communication with the first and second openings, and a wall extending from the upper base wall and into the cavity thereof proximate to the recess. The storage reel is within the cavity. The storage reel has an upper base wall which is proximate to the upper base wall of the shell, a lower base wall which is proximate to the lower base wall of the shell, an inner side wall extending from an inner perimeter of the lower base wall of the storage reel and forming a central aperture through the storage reel, the inner side wall of the storage reel being proximate to the inner side wall of the shell, an outer side wall extending between outer perimeters of the base walls and defining an outer diameter of the storage reel, the outer side wall of the storage reel being proximate to the outer side wall of the shell, the walls of the storage reel defining a cavity therein, the inner side wall of the storage reel being spaced from the upper base wall of the storage reel to define an opening extending around the storage reel, wherein the recess is partially aligned with the opening in the storage reel and the wall extends through the opening of the storage reel and into the cavity of the storage reel. A fish tape includes an elongate flexible body having a pulling eye catch on an end thereof, wherein the body passes through the opening of the storage reel and the pulling eye catch is configured to extend from each opening, wherein the fish tape is configured to contact the wall.

This Summary is provided merely for pur-poses of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which:

FIGS. 33A and 33B depict the fish tape case being worn on the front and back of an operator in a kangaroo pouch;

FIG. 34 depicts the fish tape case being carried with a strap over the shoulder of an operator;

FIG. 35 depicts the fish tape case being carried by a handle by an operator;

DETAILED DESCRIPTION

Figure 1:
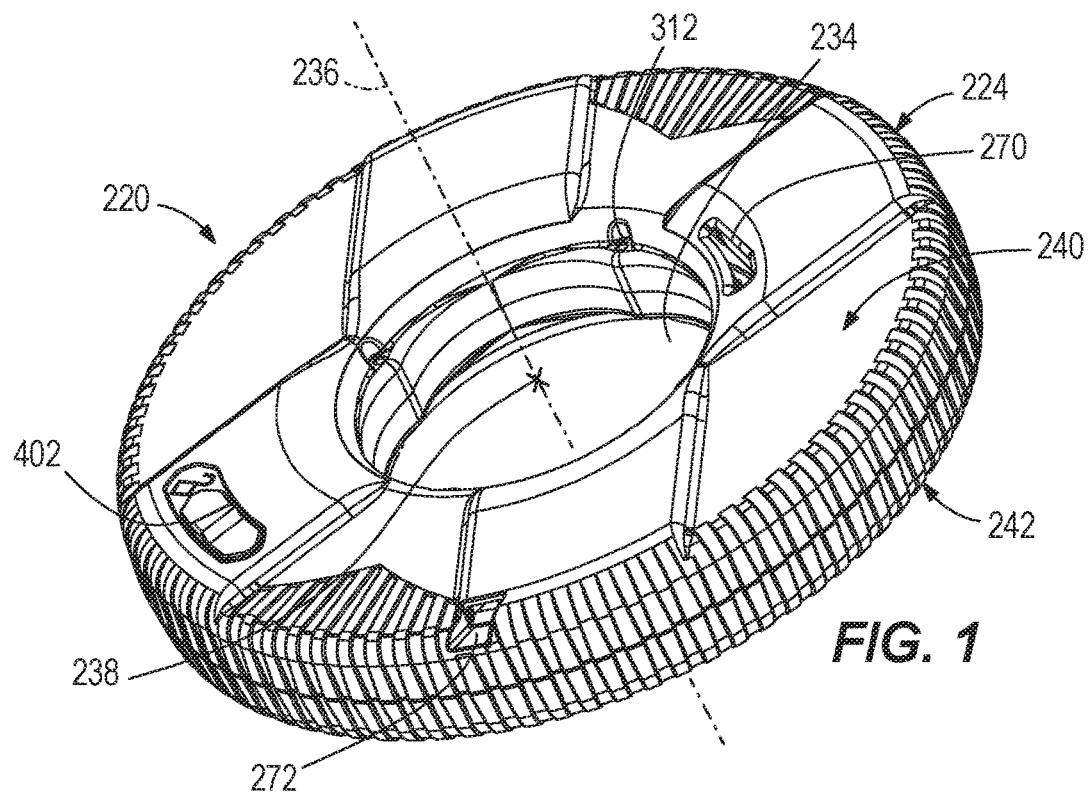
FIG. 1 depicts a perspective view of an embodiment of a fish tape case.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

An ergonomic fish tape case 220 for dispensing and retracting a fish tape 222 is provided. The fish tape case 220 includes an outer shell 224 in which a freely rotatable storage reel 226 is mounted. The fish tape 222 is spooled within the storage reel 226 and extends outwardly from the storage reel 226 and then outwardly from the outer shell 224. The fish tape case 220 is described with directional terms, such as upper, lower, upwardly, downwardly and the like which are only used herein for convenience in description and do not denote a required orientation of the fish tape case 220 in use.

Figure 5:
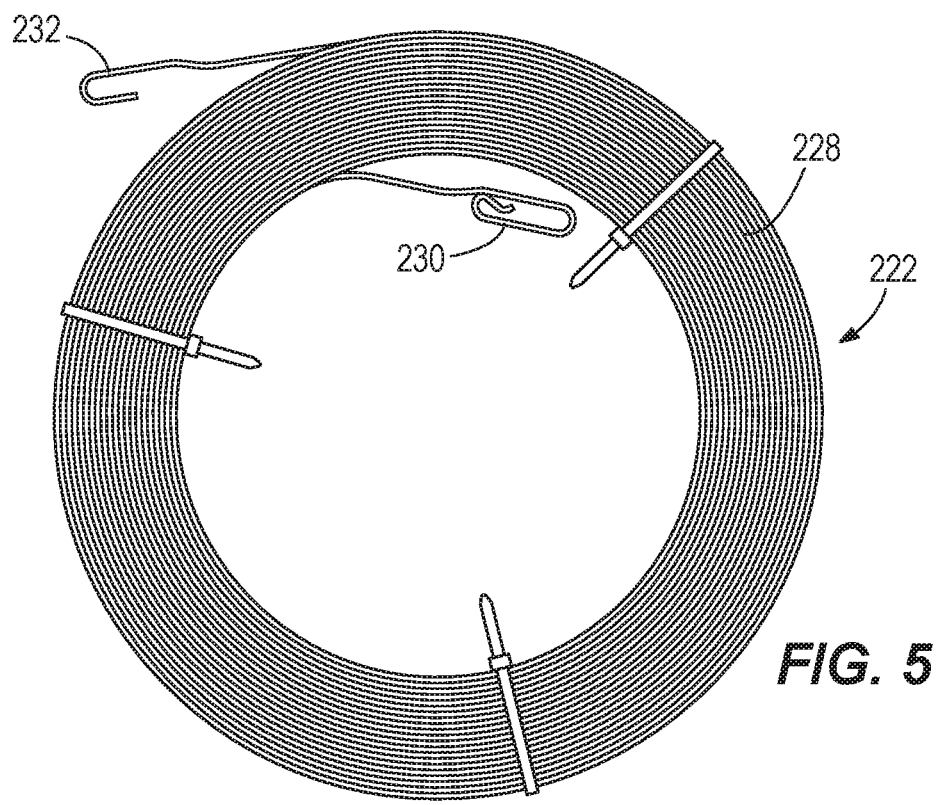
FIG. 5 depicts a side elevation view of an embodiment of a fish tape that can be used with the with the fish tape case.
Figure 6:
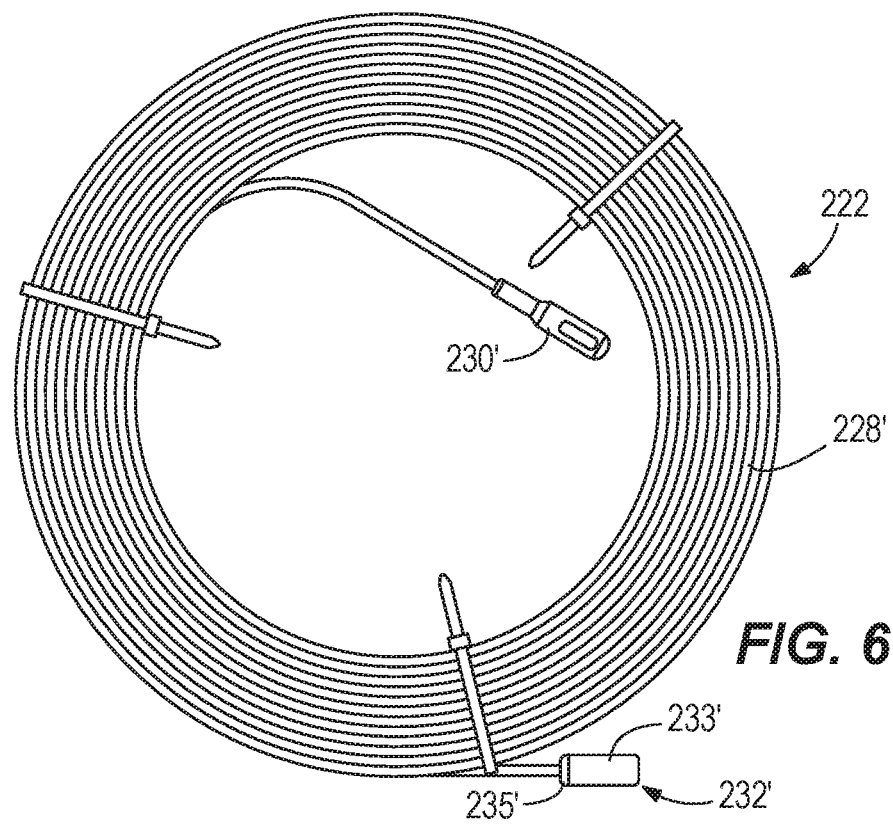
FIG. 6 depicts a side elevation view of another embodiment of a fish tape that can be used with the with the fish tape case.

As examples, the fish tape 222 can be formed of steel, nylon, plastic, fiberglass, stainless steel, and flexible steel braid. As shown in FIG. 5, the fish tape 222 includes a long body 228 formed of a strip of flexible metal or plastic that has a pulling eye catch 230 on a first free end and anchor end 232 at the second free end. As shown in FIG. 6, the fish tape 222 includes a long body 228' formed of a strip of flexible fiberglass that has a pulling eye catch 230' on a first free end and anchor end 232' at the second free end. The fish tape 222 may have a square, rectangular, or circular cross-section. The fish tape 222 may be twisted. The fish tape 222 may have dimensional markings thereon.

The fish tape 222 is spooled into a coil within the storage reel 226 such that the pulling eye catch 230, 230' is on the inner diameter of the coil and the anchor end 232, 232' is on the outer diameter of the coil. The anchor end 232, 232' prevents the fish tape 222 from being easily pulled out of the outer shell 224 as described herein.

Figure 2:
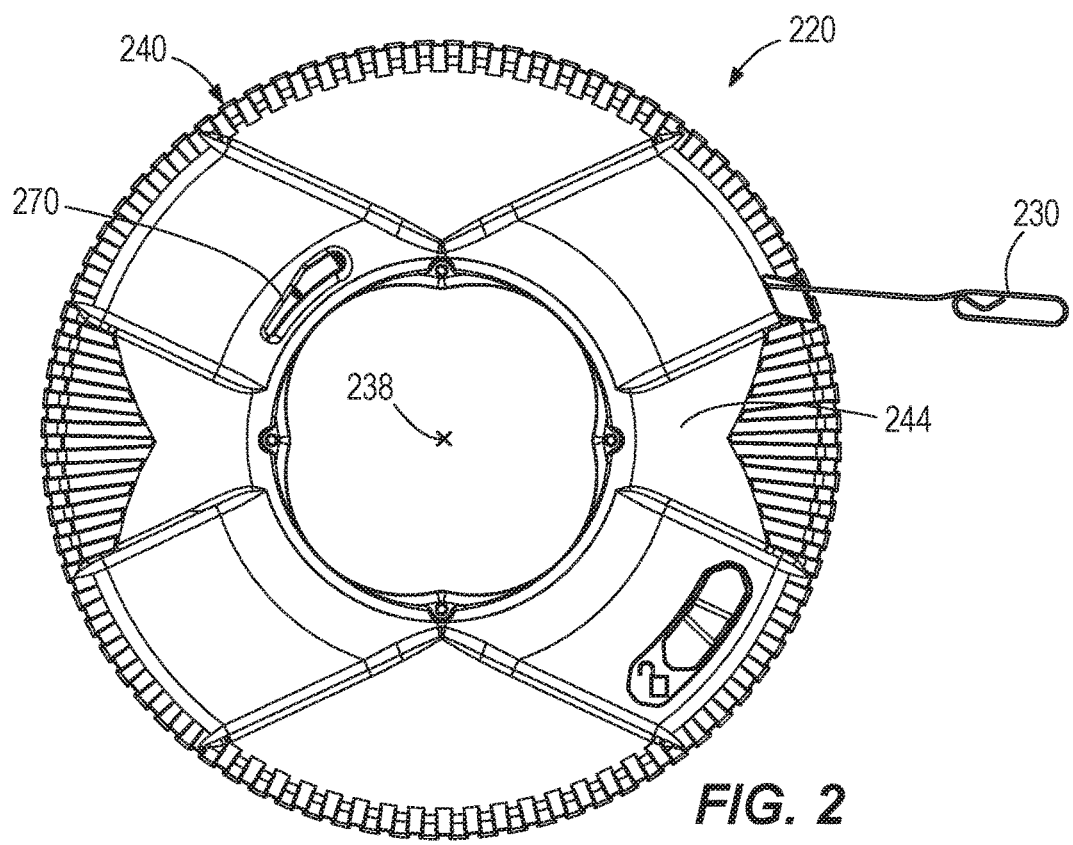
FIG. 2 depicts a top plan view of the fish tape case.
Figure 3:
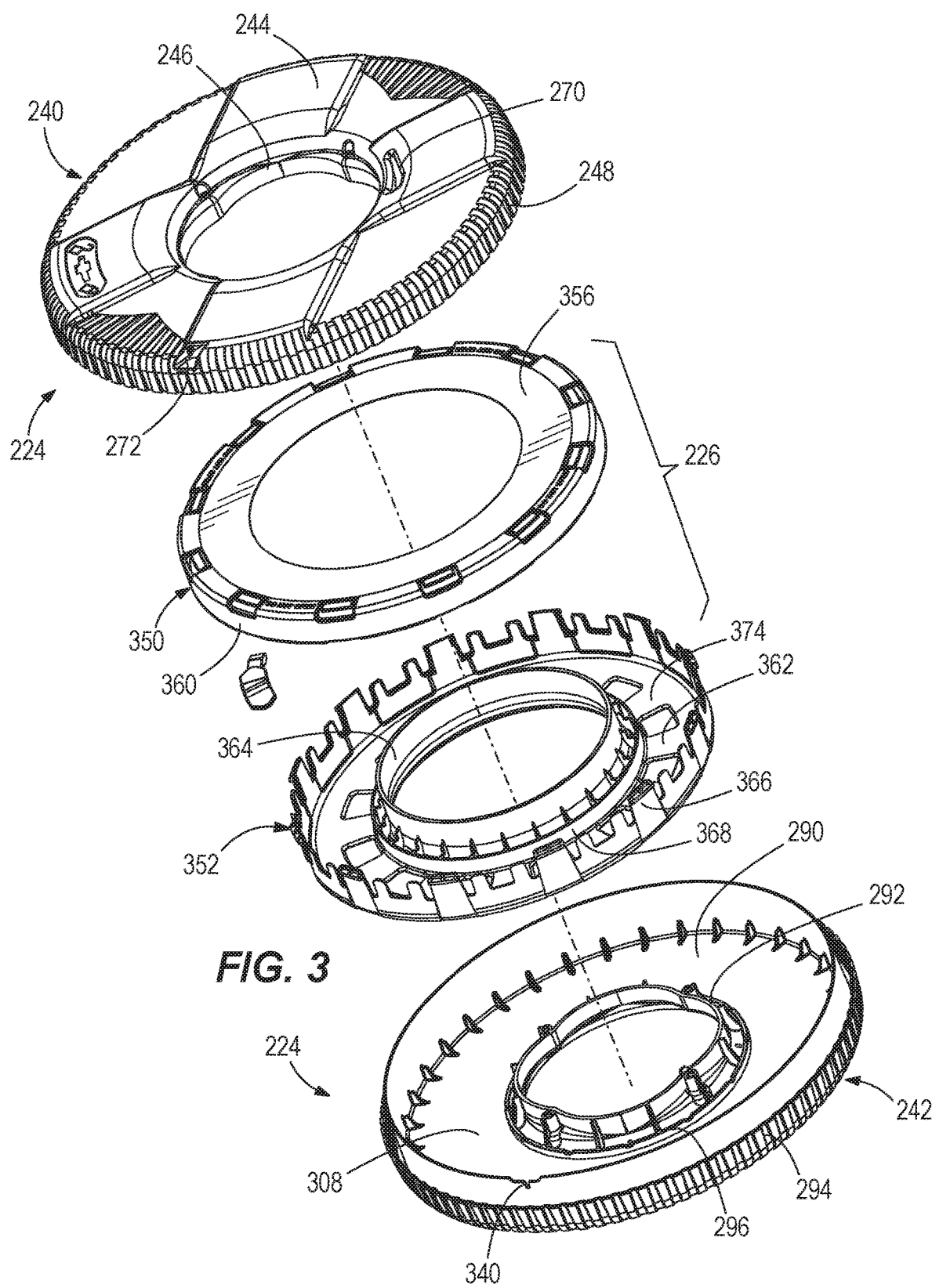
FIG. 3 depicts an exploded perspective view of the components of the fish tape case, when viewing the fish tape case from the top.

The pulling eye catch 230 takes a variety of forms depending upon which type of fish tape 222 is being used. In some embodiments, and as shown in FIGS. 2 and 5 for example, the pulling eye catch 230 may have a doubled back form which enlarges the pulling eye catch 230 from the remainder of the fish tape. The pulling eye catch 230 shown in FIGS. 2 and 5 may be suitable for use on steel fish tapes. As shown in FIG. 6, the pulling eye catch 230', shown for a fiberglass fish tape, may be a metal, such as brass, enlarged end having an opening formed therethrough which is attached to the fiberglass fish tape by suitable means. The pulling eye catch 230 for a steel fish tape may be larger than the pulling eye catch 230' for a fiberglass fish tape.

Figure 7A:
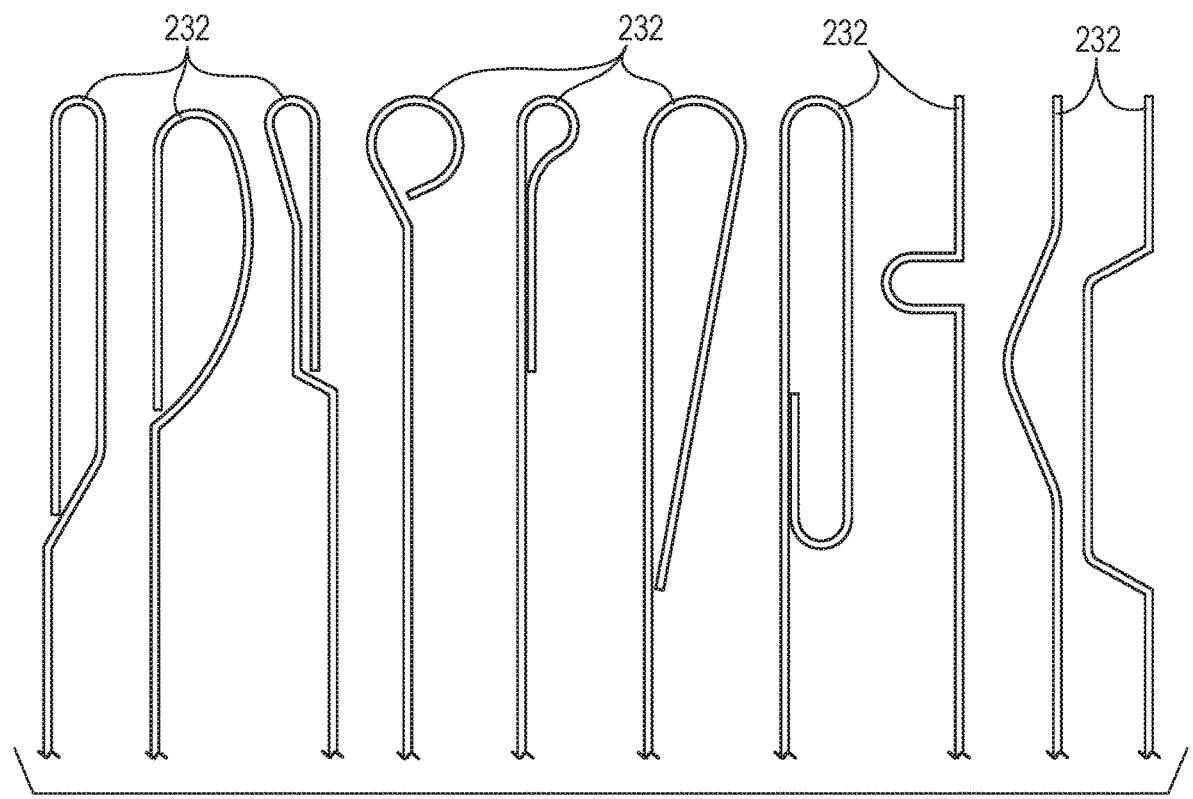
FIGS. 7A and 7B depicts top plan views of end portions of fish tapes that can be used with the with the fish tape case.
Figure 7B:
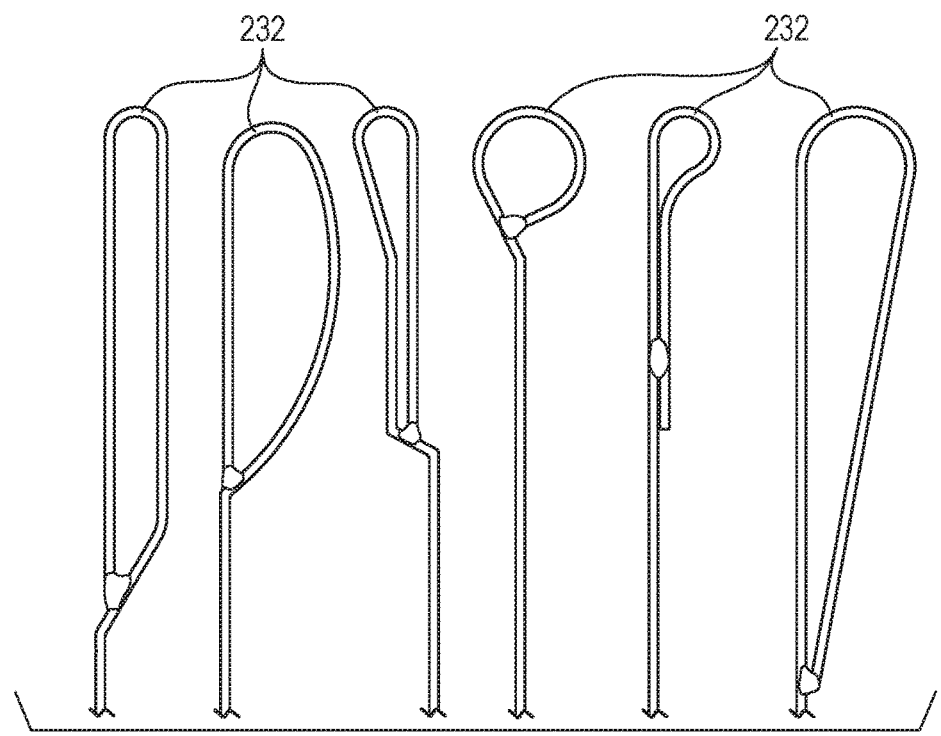

The anchor end 232 may take a variety of forms, examples of which are shown in FIGS. 7A and 7B. As shown in the examples, the anchor end 232 has an enlargement which may be formed by doubling back the fish tape body 228 to form a loop end and by providing a bend or series of bends in the fish tape body 228. The terminal end of the loop may be welded or crimped onto the fish tape body 228 to form the anchor end 232 as a closed loop as shown in FIG. 7B. The closed loop prevents the anchor end 232 from opening up and allowing the fish tape body 228 to knot itself up. For the example embodiments shown with the bend (the three rightmost in FIG. 7A), a length of the fish tape body 228 is provided after the bend. This length after the bend keeps the fish tape body 228 still partially wrapped around the storage reel 226. In some embodiments, one of the loop ends (shown as the six leftmost in FIG. 7A and shown in FIG. 7B) can be provided after the length of the fish tape body 228 after the bend to form a combination of anchor ends 232. This combination of anchor ends 232 and length of fish tape body 228 therebetween prevents the fish tape body 228 from twisting.

The anchor end 232' may be formed as shown in FIG. 11C. The anchor end 232' has a cylindrical portion 233' and a frustoconical portion 235' at an end thereof. The frustoconical portion 235' forms a chamfer on the anchor end 232'.

A blind bore or passageway (not shown) is provided in/through the portions 233', 235' so that the end of the long body 228' passes through the frustoconical portion 235' and then into/through the cylindrical portion 233'.

As shown in FIG. 1, the fish tape case 220 forms the shape of a ring having a central opening 234. A central axis 236 of the fish tape case 220 extends through a center 238 of the central opening 234.

The outer shell 224 has upper and lower shell parts 240, 242 which are mated together to form the ring shape and form the central opening 234 which defines an inner diameter of the fish tape case 220. More than two parts can be used to form the outer shell 224.

As shown in FIGS. 8-11, the upper shell part 240 includes a circular upper base wall 244, an annularly-shaped inner side wall 246 which extends downwardly from an inside peripheral edge of the base wall 244, an annularly-shaped outer side wall 248 which extends downwardly from an outside peripheral edge of the base wall 244, a first annularly-shaped intermediate wall 250 which extends downwardly from an inner surface of the base wall 244 and is spaced radially outwardly from the inner side wall 246, and a second annularly-shaped intermediate wall 252 which extends downwardly from the inner surface of the base wall 244 and is spaced radially outwardly from the first intermediate wall 250. Each wall 246, 248, 250, 252 extends in the same direction, and when viewed in cross-section, the walls 246, 248, 250, 252 are generally parallel to each other. Walls 246, 248, 250 extend completely around the circumference of the base wall 244 and each forms a ring shape. The inner side wall 246 defines an opening 254 through the upper shell part 240. The second intermediate wall 252 extends completely around the circumference of the base wall 244 to form a ring shape, with the exception of a gap 256 formed therein. An upper surface of the base wall 244 does not define any obvious means for holding the upper shell part 240.

In an embodiment, the inner side wall 246 is formed by a wall portion 258 which has an undulating shape such that a plurality of lobes are formed, and a plurality of ribs 260 extending outwardly therefrom. As shown, four lobes are formed, but more than or less than four lobes may be formed. The outer perimeters of the ribs 260 fall along an imaginary circle and the first intermediate wall 250 extends from the ribs 260.

The first and second intermediate walls 250, 252 have the same vertical height, but have a vertical height which is less than the vertical height of the inner side wall 246. The lower end of the first intermediate wall 250 forms a first bearing surface 262, see FIGS. 14 and 15, against which the storage reel 226 rides, as described herein.

Figure 8:
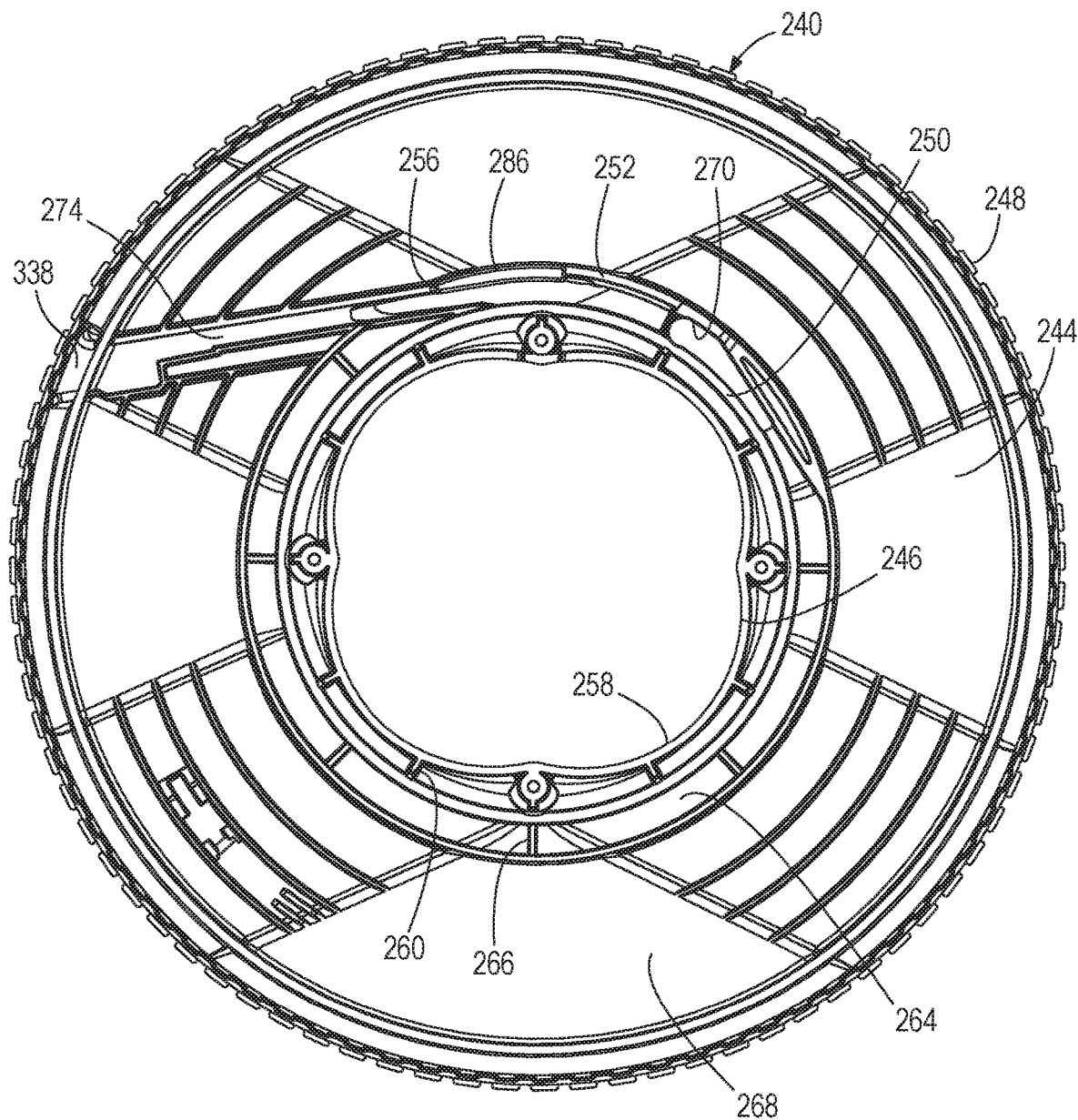
FIG. 8 depicts a bottom plan view of an upper shell part of an outer shell of the fish tape case.
Figure 9:
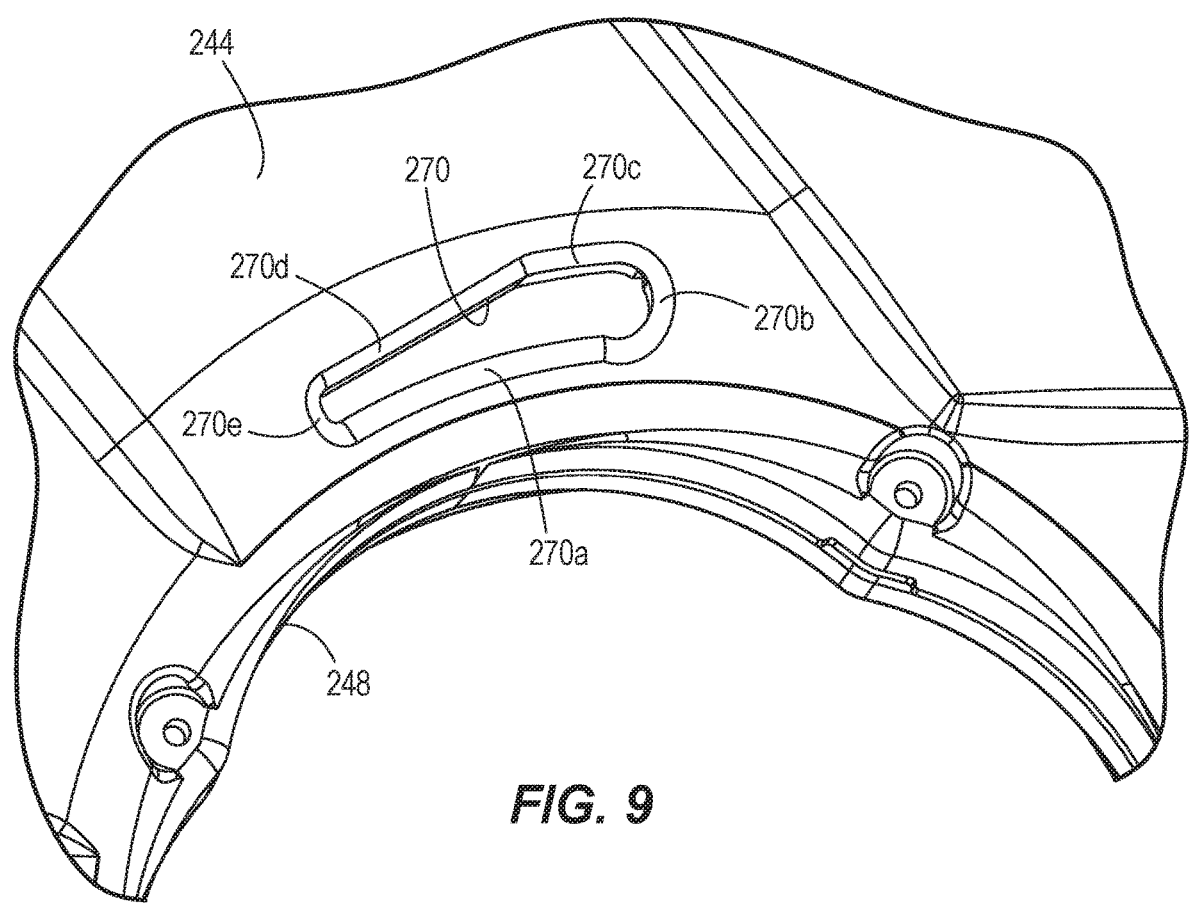
FIG. 9 depicts a top plan view of a portion of the upper shell part.

As shown in FIG. 8, an inner cavity 264 is formed by the first intermediate wall 250, the second intermediate wall 252 and the portion of the base wall 244 therebetween. A plurality of spaced apart ribs 266 may extend downwardly from the inner surface of the base wall 244 in the inner cavity 264 and between the first intermediate wall 250 and the second intermediate wall 252. An outer cavity 268 is formed by the outer side wall 248, the second intermediate wall 252 and the portion of the base wall 244 therebetween. The gap 256 is in communication with the inner cavity 264 and the outer cavity 268.

A first fish tape outlet 270 is provided through the base wall 244 and between the intermediate walls 250, 252. The first fish tape outlet 270 is in communication with the inner cavity 264. The first fish tape outlet 270 is formed by an elongated slot. The first fish tape outlet 270 may be rectangular or generally rectangular. As shown in an embodiment in FIG. 9, the first fish tape outlet 270 is generally tear-drop shaped and has first, second, third, fourth and fifth wall surfaces 270a-270e. The first wall surface 270a is curved and generally extends along a radial line extending from the center of the opening 254 of the upper shell part 240. The second wall surface 270b is semi-circular and extends from a first end of the first wall surface 270a. The third wall surface 270c extends from an outer end of the second wall surface and is linear, but extends generally parallel to the first wall surface 270a. The fourth wall surface 270d extends from a second end of the third wall surface 270c and angles toward the first wall surface 270a. The fifth wall surface 270e is at the second ends of the first and fourth wall surfaces 270a, 270d and forms a semi-circle. As such in the embodiment shown, the wall surfaces 270b, 270c and part of wall surface 270a form a wider opening portion, and the wall surfaces 270d, 270e and the other part of wall surface 270a form a narrow opening portion. The pulling eye catch 230, 230' can exit the fish tape case 220 through the wider opening portion when the fish tape 222 is pulled outwardly from the storage reel 226. In use, the fish tape 222 will be at an angle relative to the first fish tape outlet 270 such that the fish tape 222 may pass between wall surfaces 270a and 270d, further pass between walls surfaces 270a and 270c and may engage against the wall surface 270b. This prevents the pulling eye catch 230, 230' from readily passing back through the first fish tape outlet 270 since the fish tape 222 is at an angle as it exits the storage reel 226.

Figure 10:
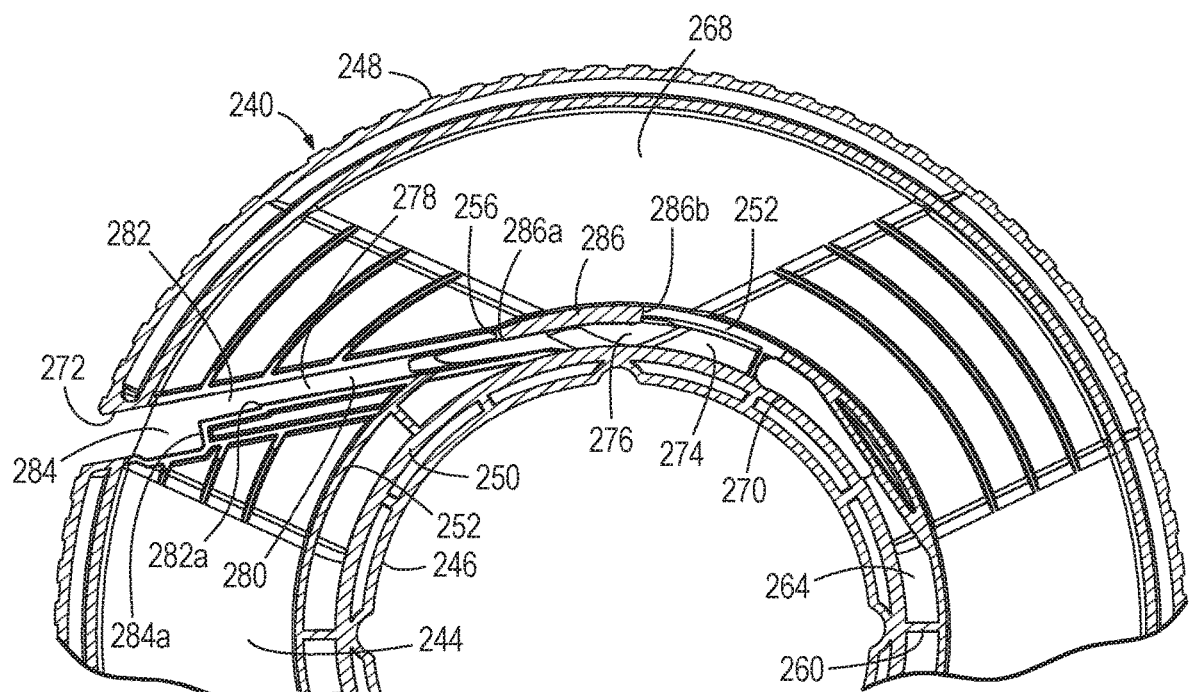
FIG. 10 depicts a partial bottom plan view of the upper shell part.
Figure 11:
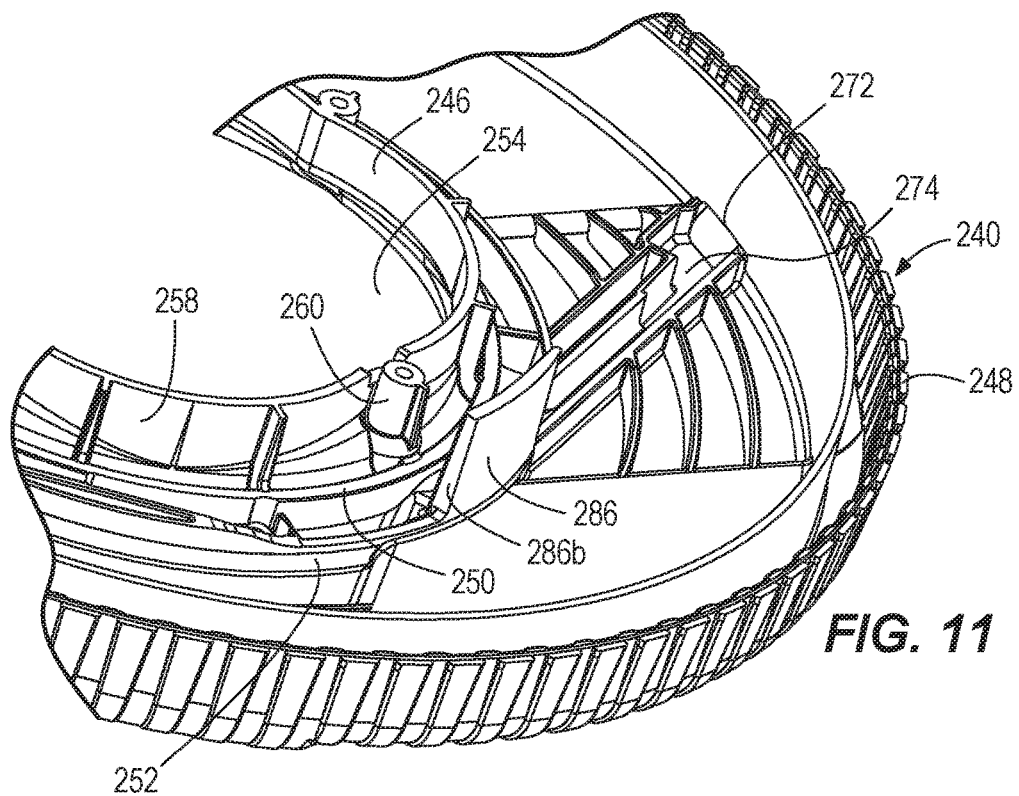
FIG. 11 depicts a partial perspective view of the upper shell part.

A second fish tape outlet 272, see FIGS. 10 and 11, is provided through the outer side wall 248 and is in communication with the outer cavity 268. The second fish tape outlet 272 enables the fish tape 222 to be extracted from a side or outer diameter of the fish tape case 220, as opposed to the face of the fish tape case 220.

As further shown in FIG. 10, a recess 274, which forms a fish tape track, extends upwardly from the lower surface of the base wall 244. The recess 274 has a first end at the first fish tape outlet 270 and a second end at the second fish tape outlet 272. A first portion 276 of the recess 274 extends from the first fish tape outlet 270 and is curved and extends along a radial line extending from the center of the opening 254 of the upper shell part 240. A second portion 278 of the recess 274 passes through the gap 256 and extends along a tangent line of the curved first portion 276 to the second fish tape outlet 272. The first portion 276 of the recess 274 is in communication with the inner cavity 264, and the second portion 278 of the recess 274 is in communication with the outer cavity 268.

The second portion 278 of the recess 274 includes an inner section 280 which extends from the first portion 276 and has a width that is the same as the width of the first portion 276, an intermediate section 282 which extends from the end of the inner section 280 and has a width which is greater than the inner section 280; and an outer section 284 which extends from the end of the intermediate section 282 and has a width which is greater than the intermediate section 282. The outer section 284 extends to the second fish tape outlet 272. As a result, an inner shoulder 282a is formed between the inner and intermediate sections 280, 282 along the length of the second portion 278 and an outer shoulder 284a is formed between the intermediate and outer sections 282, 284 along the length of the second portion 278.

As shown in FIG. 11, a curved blocking wall 286 extends downwardly from the second intermediate wall 252 and extends around a portion of the circumference of the base wall 244, and as such has a greater vertical height than the second intermediate wall 252. The blocking wall 286 is directly proximate to the gap 256 and adjacent to the first portion 276 of the recess 274. As such, the blocking wall 286 has a first end 286a directly proximate to the gap 256 and opposite second end 286b as shown in FIG. 10.

The base wall 244 and the inner side wall 246 may be connected at a curved corner; the base wall 244 and the outer side wall 248 may be connected at a curved corner.

Figure 14:
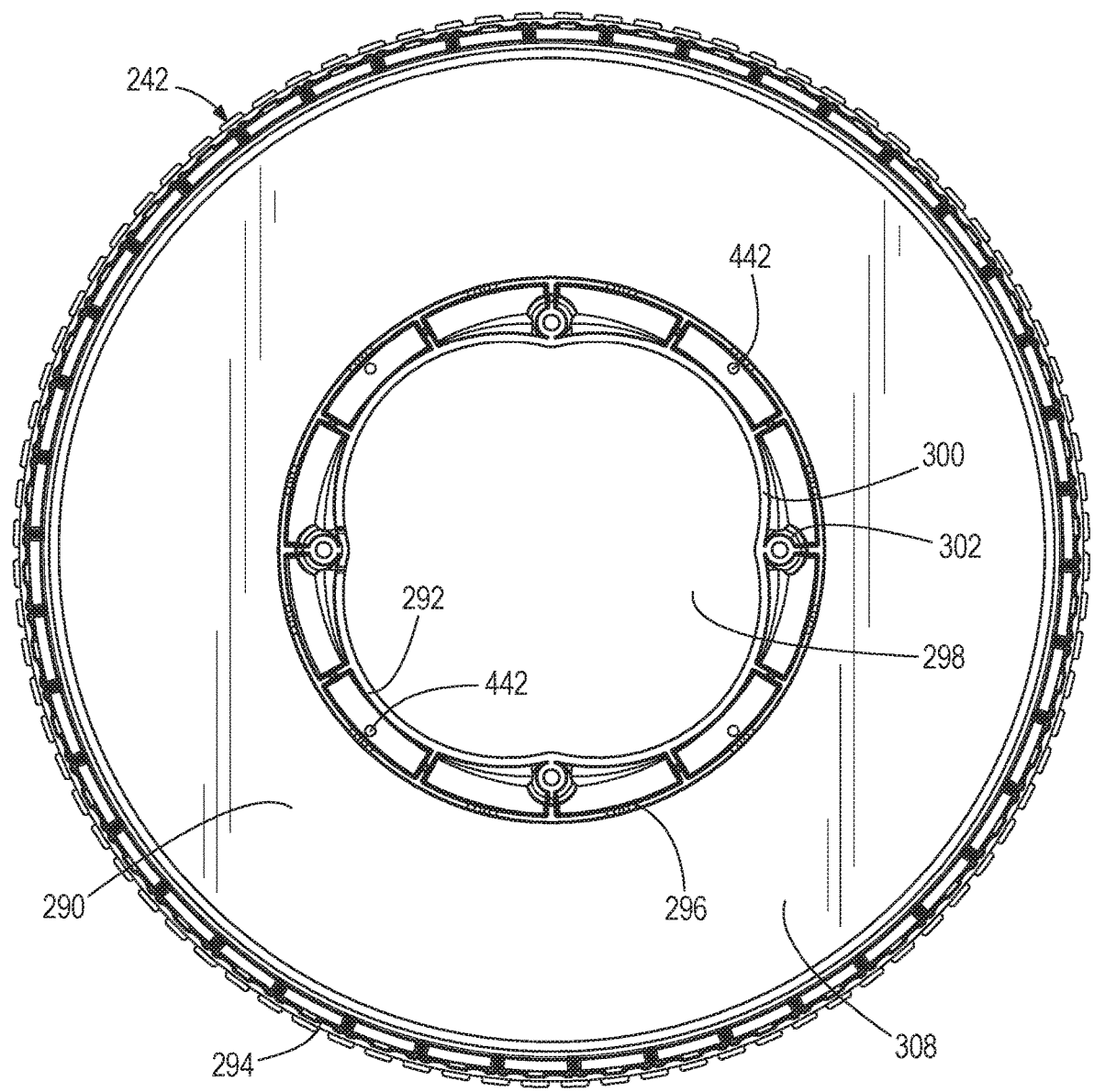
FIG. 14 depicts a top plan view of a lower shell part of the outer shell.

As shown in FIG. 14, the lower shell part 242 includes a circular lower base wall 290, an annularly-shaped inner side wall 292 which extends upwardly from an inside peripheral edge of the base wall 290, an annularly-shaped outer side wall 294 which extends upwardly from an outside peripheral edge of the base wall 290, and an annularly-shaped intermediate wall 296 which extends upwardly from an inner surface of the base wall 290 and is spaced radially outwardly from the inner side wall 292. Each wall 292, 294, 296 extends in the same direction, extend completely around the circumference of the base wall 290 to each form a ring shape, and when viewed in cross-section, the walls 292, 294, 296 are generally parallel to each other. The inner side wall 292 defines an opening 298 through the lower shell part 242. A lower surface of the base wall 290 does not define any obvious means for holding the lower shell part 242.

In an embodiment, the inner side wall 292 is formed by a wall portion 300 which has an undulating shape such that a plurality of lobes are formed, and a plurality of ribs 302 extending outwardly therefrom. As shown, four lobes are formed, but more than or less than four lobes may be formed. The outer perimeters of the ribs 302 fall along an imaginary circle and the intermediate wall 296 extends from the ribs 302.

The intermediate wall 296 has a vertical height which is less than the vertical height of the inner side wall 292. The upper end of the intermediate wall 296 forms a second bearing surface 304, see FIGS. 12 and 13, against which the storage reel 226 rides, as described herein, and the outer surface of the intermediate wall 296 forms a third bearing surface 306, see FIGS. 12 and 13, against which the storage reel 226 rides, as described herein.

Figure 12:
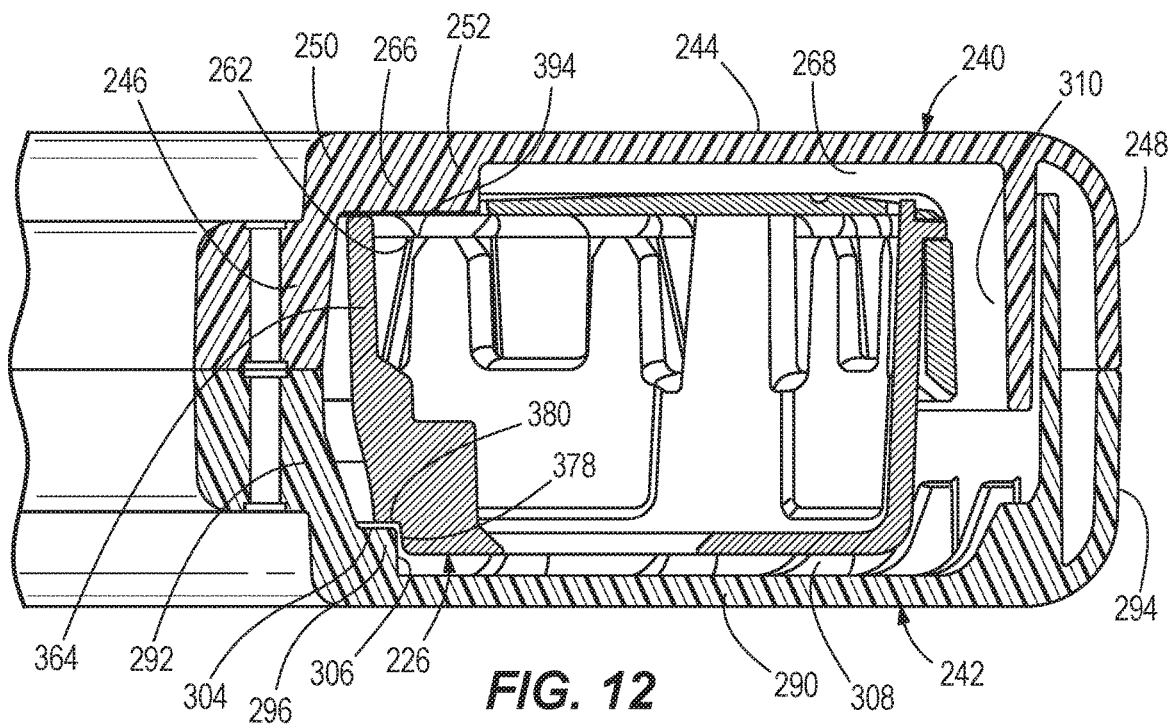
FIGS. 12 and 13 depict partial cross-sectional views through the fish tape case.
Figure 13:
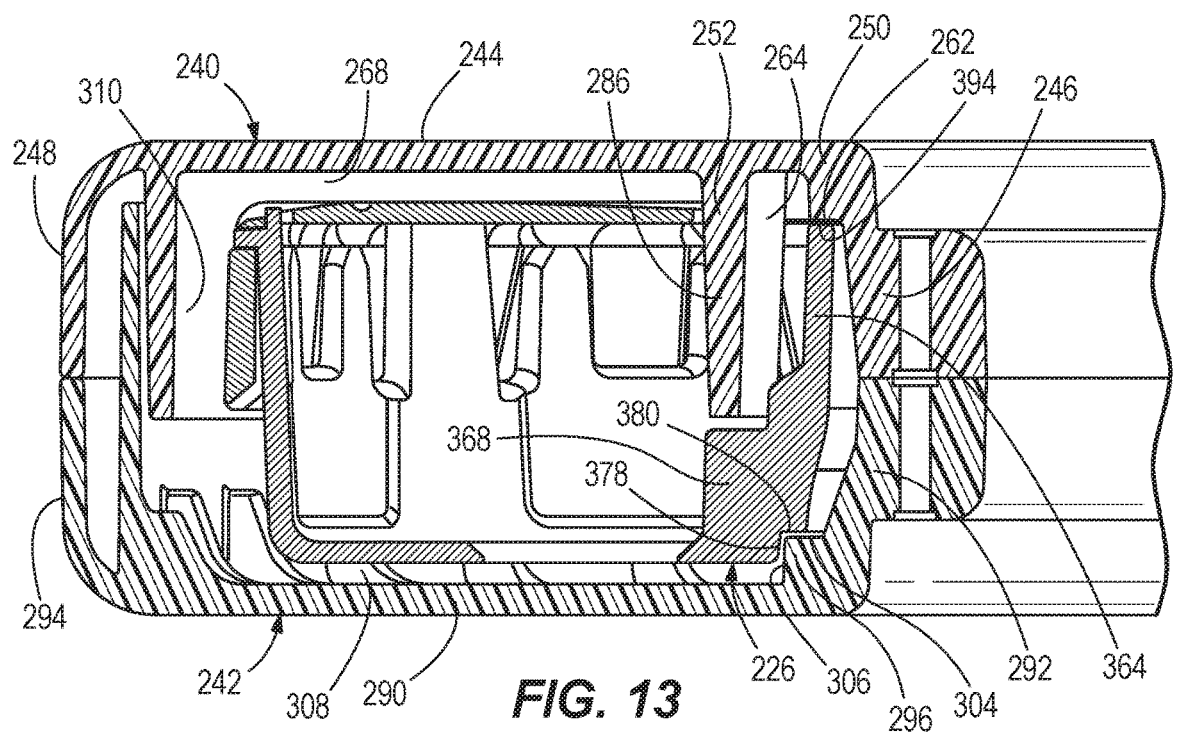

A cavity 308, see FIGS. 12-14, is formed by the outer side wall 294, the intermediate wall 296, and the portion of the base wall 290 therebetween.

The base wall 290 and the inner side wall 292 may be connected at a curved corner; the base wall 290 and the outer side wall 294 may be connected at a curved corner.

When the shell parts 240, 242 are mated together as shown in FIGS. 12 and 13, the lower surface of the inner side wall 246 mates with the upper surface of the inner side wall 292, and the outer side walls 248, 294 mate together. The undulating shapes of the wall portions 258, 300 align with each other and the openings 254, 298 align with each other to form the central opening 234. The cavities 264, 268 in the upper shell part 240 align with the cavity 308 in the lower shell part 242 to form a reel receiving space 310. The first intermediate wall 250 of the upper shell part 240 vertically aligns with the intermediate wall 296, and the bearing surfaces 262, 304 are spaced apart from each other and are generally parallel to each other. The blocking wall 286 extends partially into the cavity 308 of the lower shell part 242 and is vertically aligned with the base wall 290 outwardly of the intermediate wall 296.

When mated together, the annularly-shaped inner side walls 246, 292 form a plurality of curved lobes. As shown best in FIG. 2, four lobes are formed. This shape provides a comfortable gripping surface when the fish tape 222 is being rewound into the fish tape case 220, or when the fish tape case 220 is being carried if a strap or handle is not being used.

In an embodiment, some of the ribs 260, 302 in the shell parts 240, 242 are fastener receiving bosses in which fasteners 312, see FIG. 1, are mounted in passageways thereof. The fasteners 312 may be seated in countersinks in one of the shell parts 240, 242. The fasteners 312 may be self-tapping, or the passageways may be threaded for receiving the fasteners 312.

The outer side walls 248, 294 can take a variety forms to mate together as shown in FIGS. 15-21. The upper and lower shell parts 240, 242 are asymmetrical and the outer side walls 248, 294 form an overlap with each other on the outer diameter of the fish tape case 220. The overlap encloses the storage reel 226 within the outer shell 224 and reduces deflection of the mated shell parts 240, 242. Reduced deflection reduces contact and force on the storage reel 226 during impact, for example if the fish tape case 220 was dropped.

Figure 15:
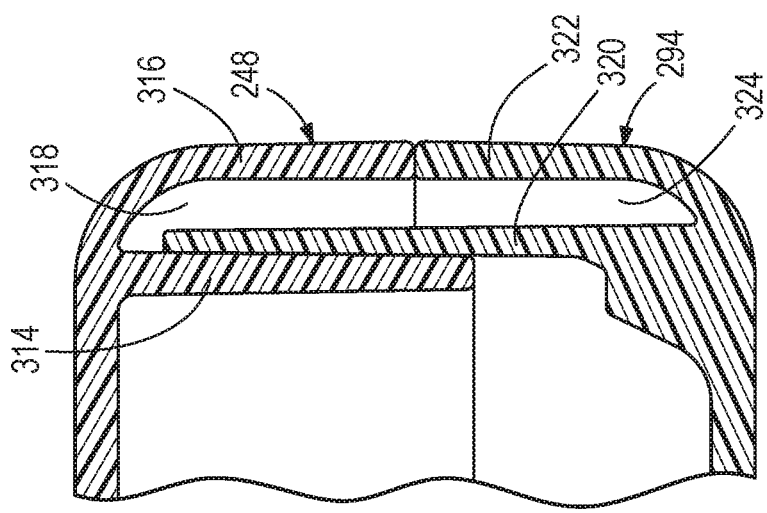

In an embodiment as shown in FIG. 15, the outer side wall 248 has an inner wall portion 314, an outer wall portion 316, and a pocket 318 is formed by the wall portions 314, 316. The inner wall portion 314 may have a height which is greater than the height of the outer wall portion 316. The outer side wall 294 has an inner wall portion 320, an outer wall portion 322, and a pocket 324 formed by the wall portions 320, 322. The inner wall portion 320 has a height which is greater than the height of the outer wall portion 322. When the shell parts 240, 242 are mated together, the ends of the outer wall portions 316, 322 abut against each other, and the inner wall portion 320 seats within the pocket 318. As would be understood by one of ordinary skill in the art, the components described for the outer side wall 248 could instead be provided by outer side wall 294, with the components described for the outer side wall 294 instead provided by outer side wall 248. That is, the outer side wall 294 includes the inner and outer wall portions 314, 316 and the pocket 318, and the outer side wall 248 includes the inner and outer wall portions 320, 322 and the pocket 324.

Figure 17:
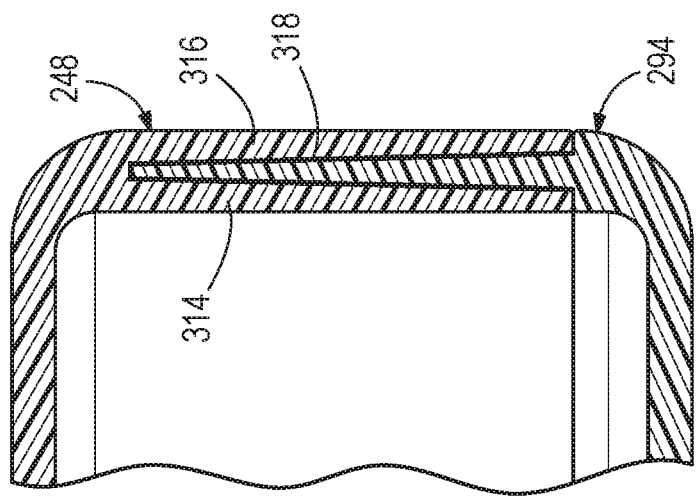
FIGS. 15-21 depict partial cross-sectional views side walls of the outer shell.
Figure 16:
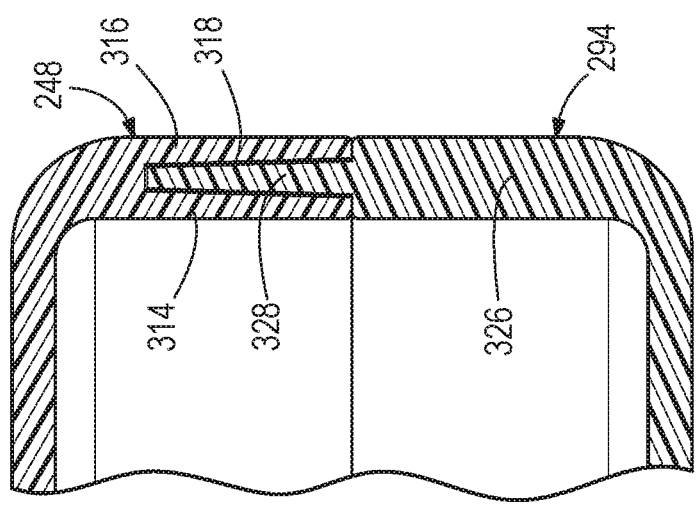

In embodiments as shown in FIGS. 16 and 17, the outer side wall 248 has an inner wall portion 314, an outer wall portion 316, and a pocket 318 formed by the wall portions 314, 316. The heights of the wall portions 314, 316 are the same. The outer side wall 294 has a first wall portion 326 and a second wall portion 328 which extends from the end of the first wall portion 326. The second wall portion 328 has a width which is less than the width of the first wall portion 326. When the upper and lower shell parts 240, 242 are mated together, the ends of the wall portions 314, 316 abut against the end of the first wall portion 326, and the second wall portion 328 seats within the pocket 318. As would be understood by one of ordinary skill in the art, the components described for the outer side wall 248 could instead be provided by outer side wall 294, with the components described for the outer side wall 294 instead provided by outer side wall 248. That is, the outer side wall 294 has the inner and outer wall portions 314, 316 and the pocket 318, and the outer side wall 248 has the first and second wall portion 326, 328. The embodiment of FIG. 20 differs from the embodiment of FIG. 21 in that the wall portions 314, 316 extend along approximately half of the height of the fish tape case 220 in the embodiment of FIG. 20, while the wall portions 314, 316 extend along almost the full height of the fish tape case 220 in the embodiment of FIG. 21.

Figure 18:
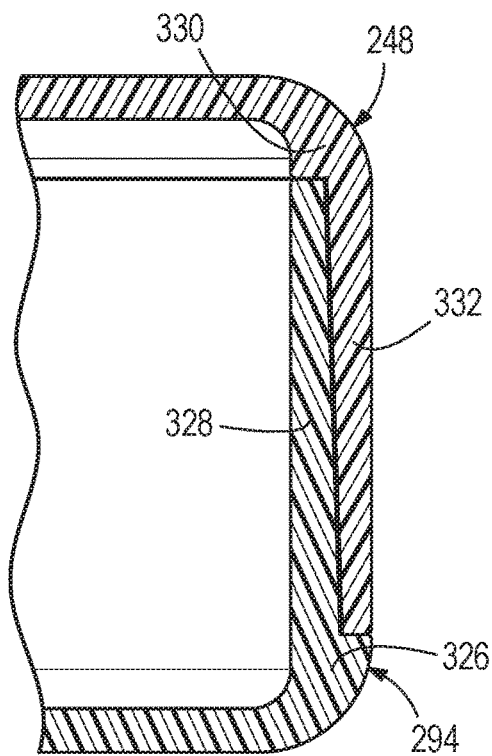

In an embodiment as shown in FIG. 18, the outer side wall 248 has a first wall portion 330 and a second wall portion 332 which extends from the end of the first wall portion 330. The second wall portion 332 extends from an outer section of the end of the first wall portion 330 and has a width which is less than the width of the first wall portion 330. The outer side wall 294 has a first wall portion 326 and a second wall portion 328 which extends from the end of the first wall portion 326. The second wall portion 328 extends from an inner section of the end of the first wall portion 326 and has a width which is less than the width of the first wall portion 326. The heights of the first wall portions 328, 332 are the same. When the upper and lower shell parts 240, 242 are mated together, the end of the first wall portion 330 abuts against the end of the second wall portion 328, the end of the first wall portion 326 abuts against the end of the second wall portion 332, and the inner surface of the second wall portion 332 abuts against the outer surface of the second wall portion 328. As would be understood by one of ordinary skill in the art, the components described for the outer side wall 248 could instead be provided by outer side wall 294, with the components described for the outer side wall 294 instead provided by outer side wall 248. That is, the outer side wall 294 has the first and second wall portions 330, 332, and the outer side wall 248 has the first and second wall portions 326, 328.

Figure 19:
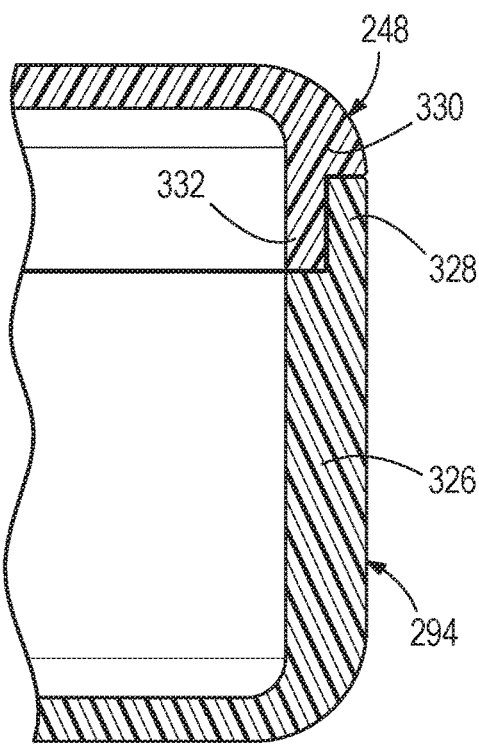

In an embodiment as shown in FIG. 19, the outer side wall 248 has a first wall portion 330 and a second wall portion 332 which extends from the end of the first wall portion 330. The second wall portion 332 extends from an inner section of the end of the first wall portion 330 and has a width which is less than the width of the first wall portion 330. The outer side wall 294 has a first wall portion 326 and a second wall portion 328 which extends from the end of the first wall portion 326. The second wall portion 328 extends from an outer section of the end of first wall portion 326 and has a width which is less than the width of the first wall portion 326. The heights of the first wall portions 326, 330 are different, and the heights of the second wall portions 328, 332 are the same. When the upper and lower shell parts 240, 242 are mated together, the end of the first wall portion 330 abuts against the end of the second wall portion 328, the end of the first wall portion 326 abuts against the end of the second wall portion 332, and the inner surface of the second wall portion 328 abuts against the outer surface of the second wall portion 332. As would be understood by one of ordinary skill in the art, the components described for the outer side wall 248 could instead be provided by outer side wall 294, with the components described for the outer side wall 294 instead provided by outer side wall 248. That is, the outer side wall 294 has the first and second wall portions 330, 332, and the outer side wall 248 has the first and second wall portions 326, 328.

Figure 20:
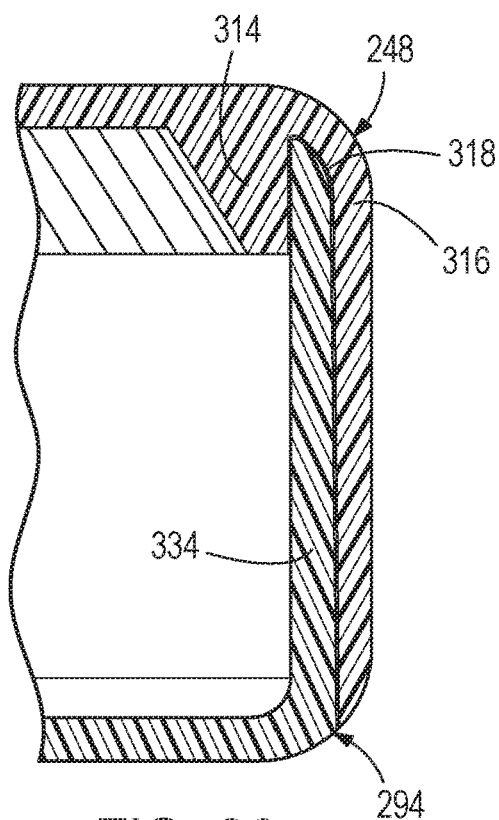

In an embodiment as shown in FIG. 20, the outer side wall 248 has an inner wall portion 314, an outer wall portion 316, and a pocket 318 is formed by the wall portions 314, 316. The inner wall portion 314 has a height which is substantially less than the height of the outer wall portion 316, and the outer wall portion 316 extends substantially the full height of the fish tape case 220. The outer side wall 294 has a wall portion 334 which extends substantially the full height of the fish tape case 220. When the upper and lower shell parts 240, 242 are mated together, the end of the wall portion 334 seats within the pocket 318 and the outer surface of the wall portion 334 abuts against the inner surface of the outer wall portion 316. As would be understood by one of ordinary skill in the art, the components described for the outer side wall 248 could instead be provided by outer side wall 294, with the components described for the outer side wall 294 instead provided by outer side wall 248. That is, the outer side wall 294 has the inner and outer wall portions 314, 316 and the pocket 318, and the outer side wall 248 has the wall portion 334.

Figure 21:
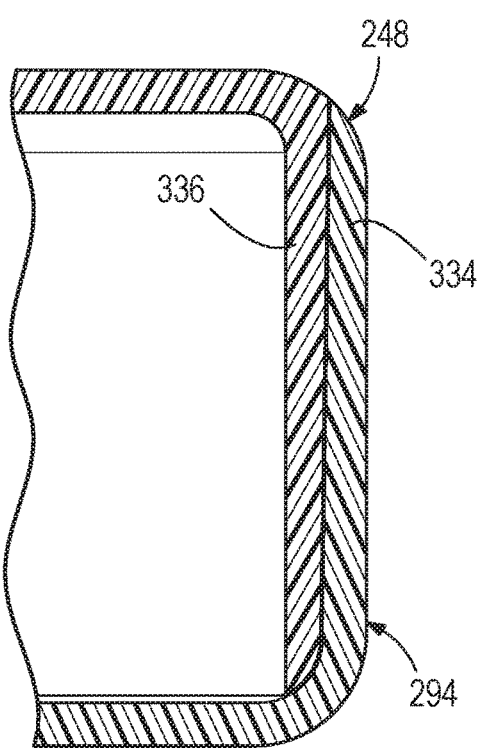

In an embodiment as shown in FIG. 21, the outer side wall 248 has a wall portion 336 which extends substantially the full height of the fish tape case 220 and the outer side wall 294 has a wall portion 334 which extends substantially the full height of the fish tape case 220. When the upper and lower shell parts 240, 242 are mated together, the outer surface of the wall portion 336 abuts against the inner surface of the wall portion 334. As would be understood by one of ordinary skill in the art, the components described for the outer side wall 248 could instead be provided by outer side wall 294, with the components described for the outer side wall 294 instead provided by outer side wall 248. That is, the outer side wall 294 has the wall portion 336 and the outer side wall 248 has the wall portion 334.

Figure 4:
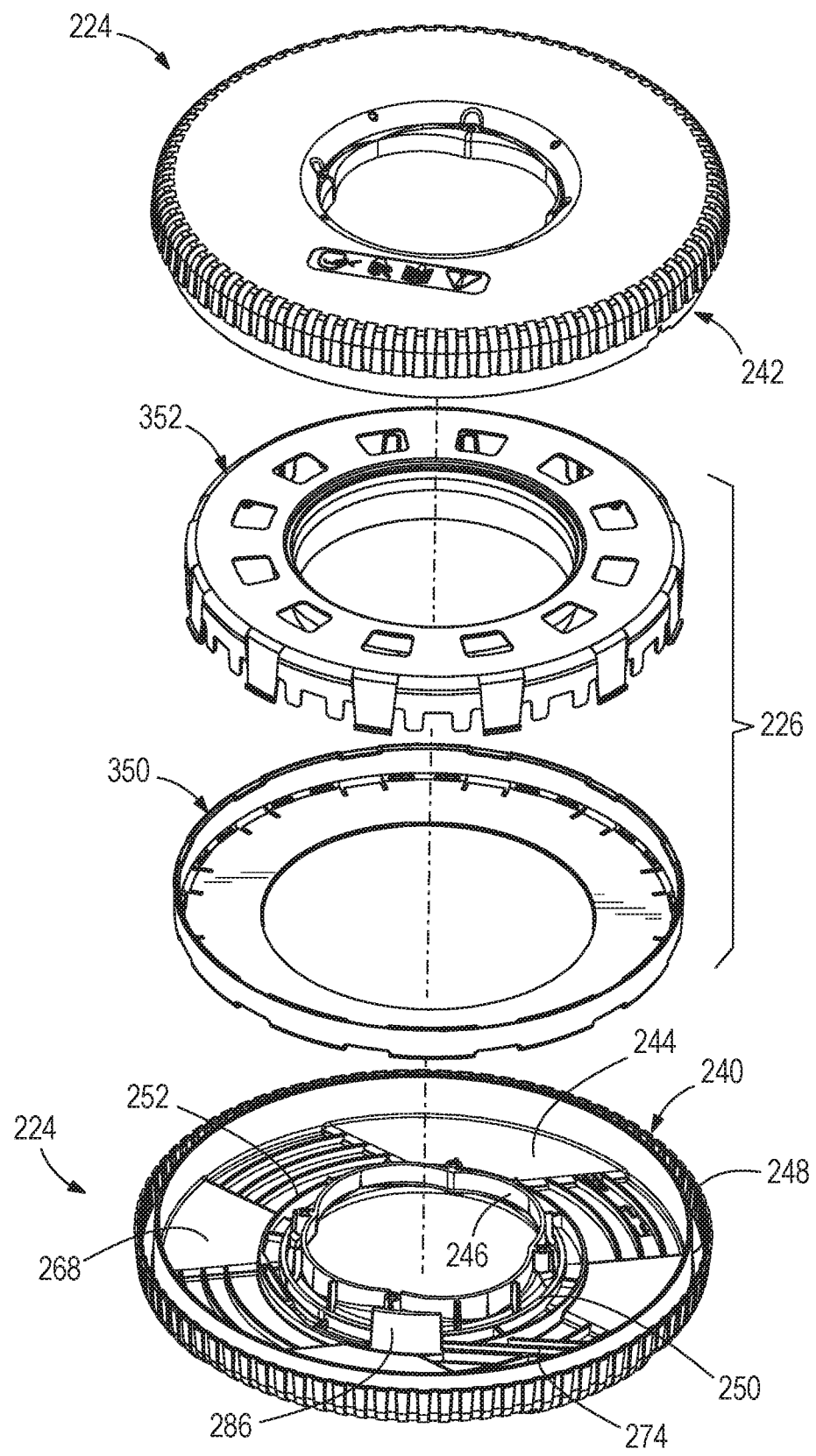
FIG. 4 depicts an exploded perspective view of the components of the fish tape case, when viewing the fish tape case from the bottom.

The upper and lower shell parts 240, 242 may include alignment features that require the upper and lower shell parts 240, 242 to be assembled in a specific orientation relative to each other so that the fasteners 312 can be installed. For example, a key 338, see FIG. 8, may be formed on the upper shell part 240 which fits into a keyway 340, see FIG. 4, on the lower shell part 242. If the key 338 and the keyway 340 do not align, the upper and lower shell parts 240, 242 cannot be readily assembled. Other alignment features may also be included such as the fastener receiving bosses in the ribs 260 having a specific structure that seats within specific structure formed in the mating rib 302.

As shown in FIGS. 22-26, the storage reel 226 has upper and lower reel parts 350, 352 which are mated together to form a ring shape and form a central aperture 354.

Figure 23:
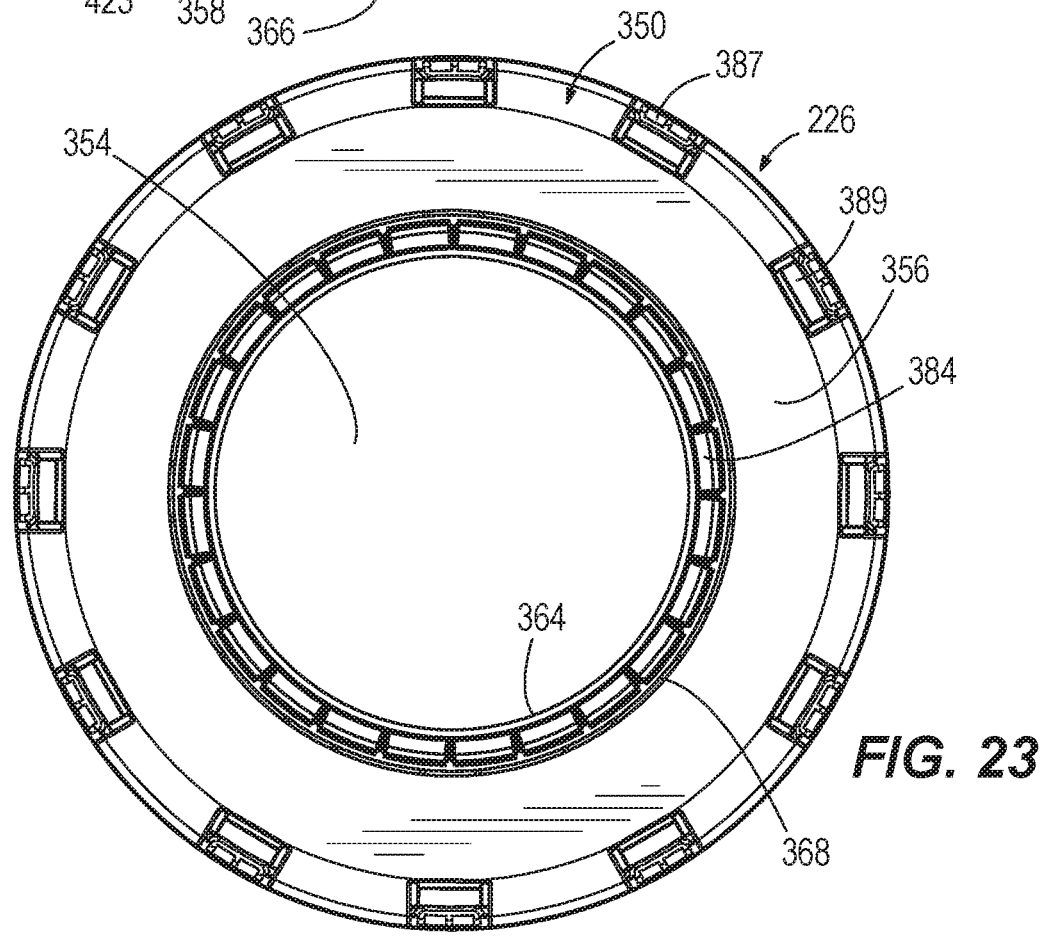
FIG. 23 depicts a top plan view of the storage reel.
Figure 24:
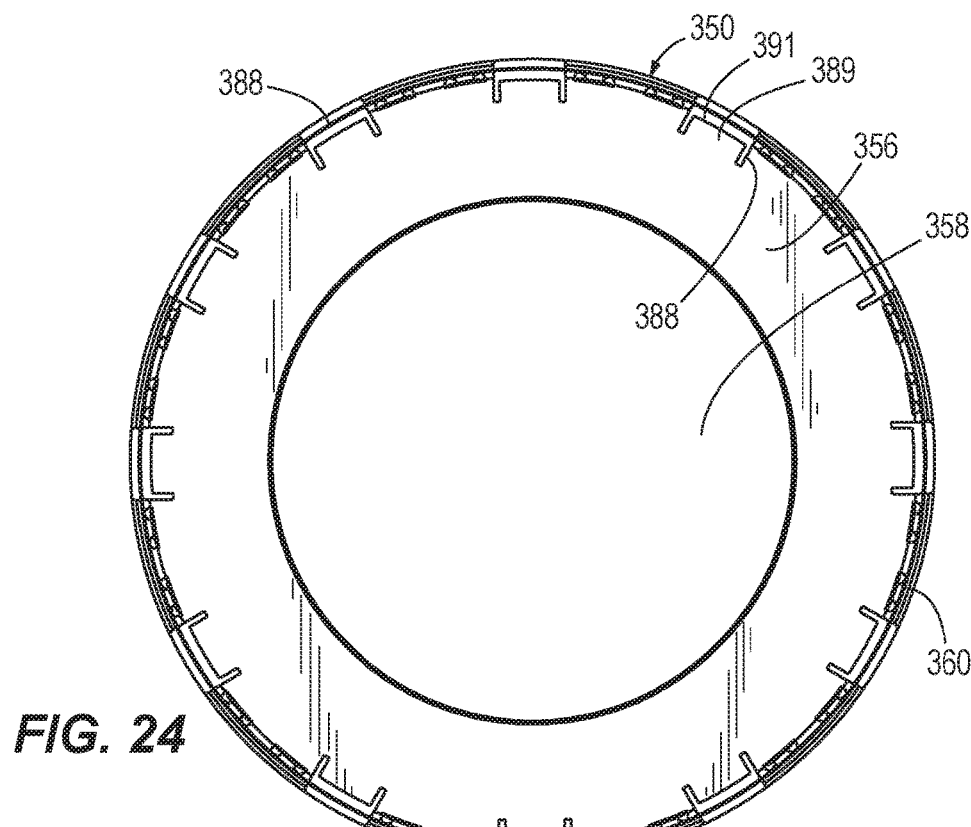
FIG. 24 depicts a top plan view of an upper reel part of the storage reel.

As shown in FIGS. 23 and 24, the upper reel part 350 includes a circular upper base wall 356 having a central opening 358 therethrough, and an annularly-shaped outer side wall 360 which extends downwardly from an outside peripheral edge of the base wall 356. The base wall 356 has inner and outer planar surfaces. The outer side wall 360 extends completely around the circumference of the base wall 356 and forms a ring shape.

Figure 25:
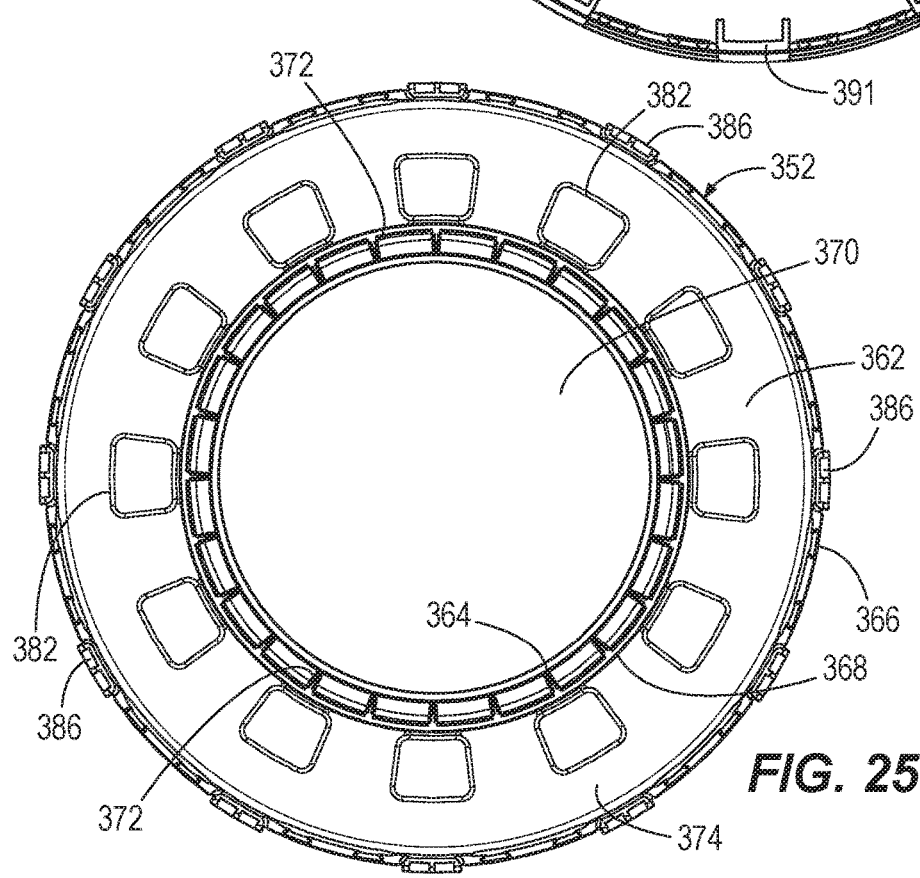
FIG. 25 depicts a top plan view of a lower reel part of the storage reel.
Figure 26:
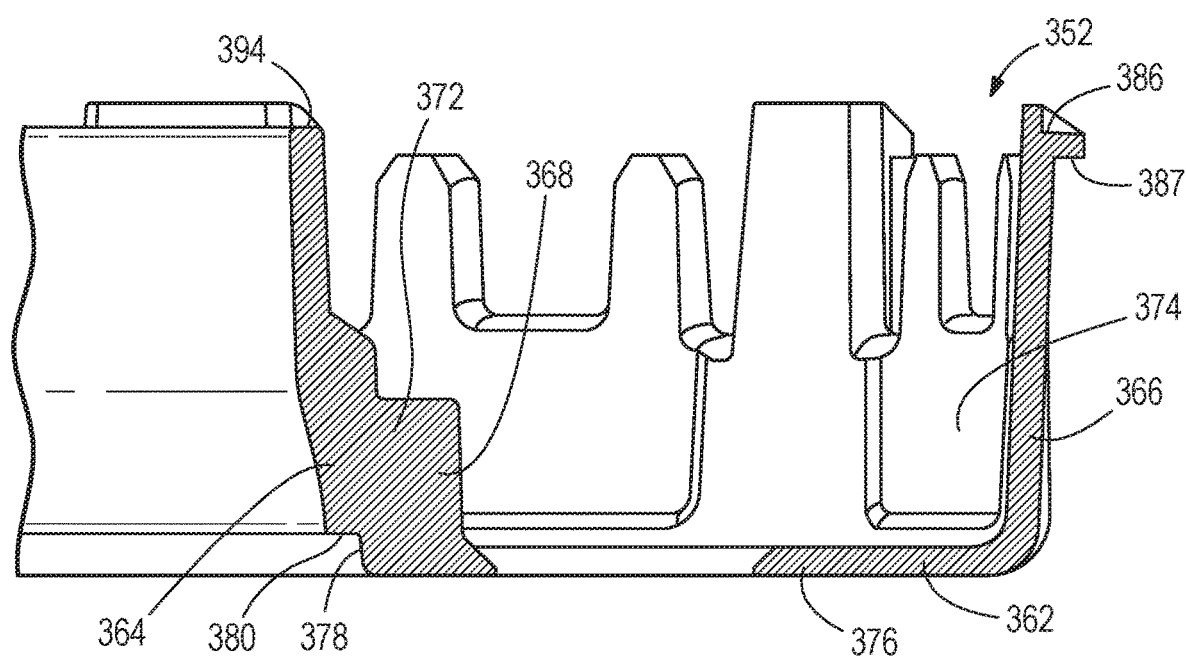
FIG. 26 depicts a partial cross-sectional view of the lower reel part.
Figure 27:
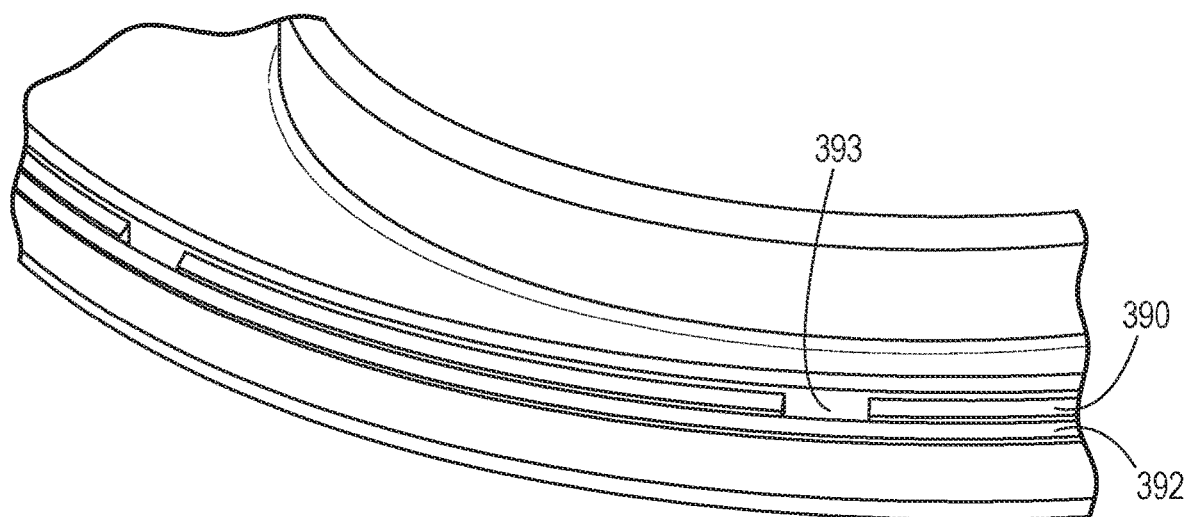
FIGS. 27-29 depict partial perspective views of an embodiment of the lower reel part.
Figure 28:
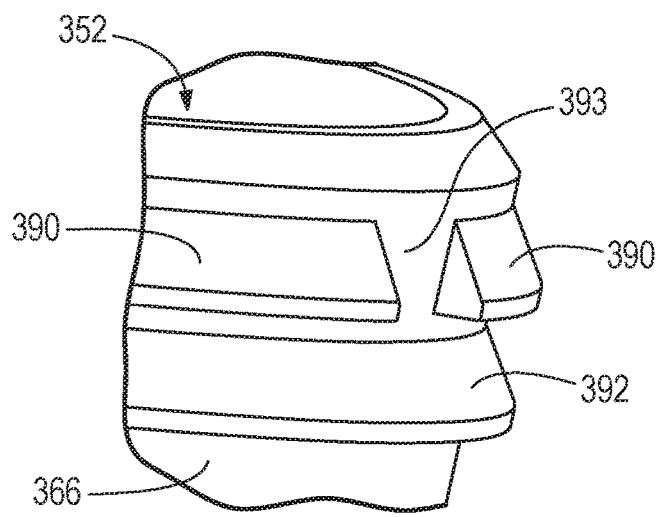
Figure 29:
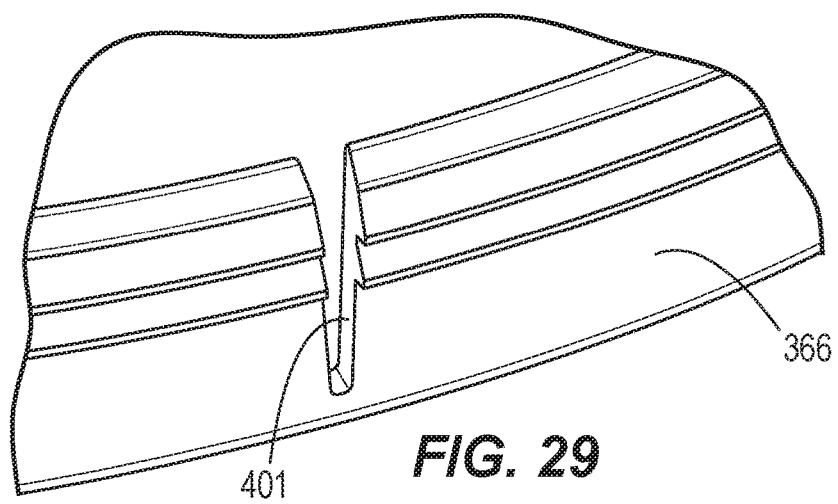
Figure 30:
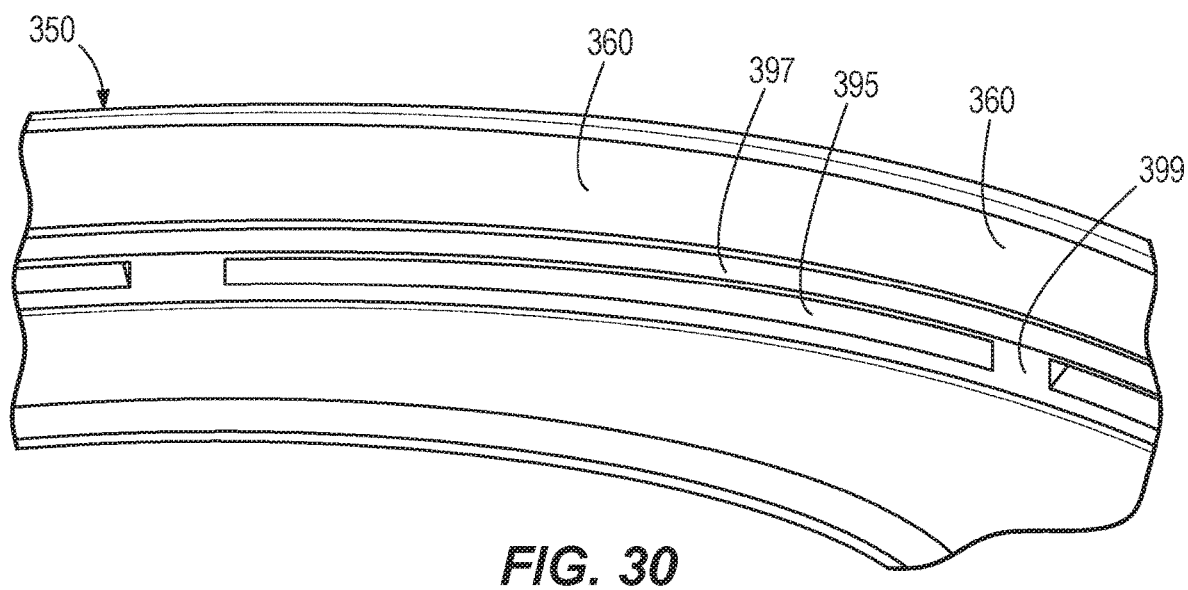
FIGS. 30 and 31 depict partial perspective views of an embodiment of the upper reel part.
Figure 31:
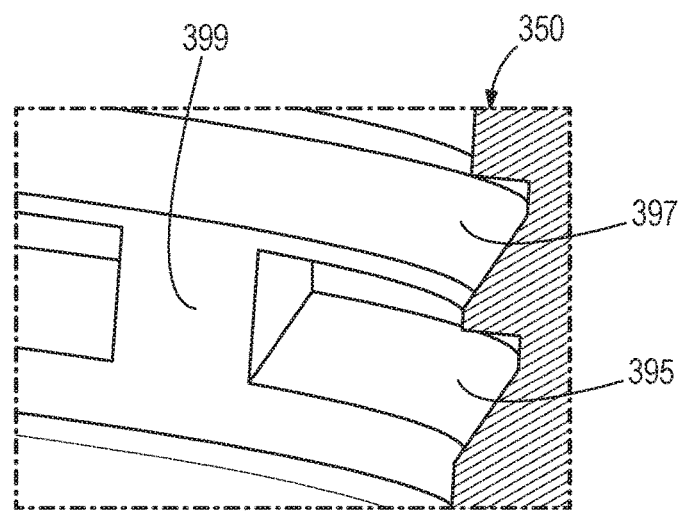

As shown in FIGS. 25 and 26, the lower reel part 352 includes a circular lower base wall 362, an annularly-shaped inner side wall 364 which extends upwardly from an inside peripheral edge of the base wall 362, an annularly-shaped outer side wall 366 which extends upwardly from an outside peripheral edge of the base wall 362, and an annularly-shaped intermediate wall 368 which extends upwardly from an inner surface of the base wall 362 and between the inner side wall 364 and the outer side wall 366. Each wall 364, 366, 368 extends in the same direction and extends completely around the circumference of the base wall 362 to form a ring shape. The inner side wall 364 defines a central opening 370 therethrough. When viewed in cross-section, the walls 364, 366, 368 are generally parallel to each other. A plurality of ribs 372 extend between the inner side wall 364 and the intermediate wall 368. A cavity 374 is formed by the walls 362, 364, 366, 368.

The ends of the inner and outer side walls 364, 366 are generally spaced from the base wall 362 at the same vertical height. The intermediate wall 368 has a vertical height which is substantially less than the heights of the inner and outer side walls 364, 366.

The upper surface of the base wall 362 is planar. The lower surface of the base wall 362 has a first planar surface portion 376 extending inwardly from the outer side wall 366, a second vertical surface portion 378 extending from an inner end of the first planar surface portion 376, and a third horizontal surface portion 380 extending from an upper end of the second vertical surface portion 378 to the inner end of the base wall 362. The second and third surface portions 378, 380 form a step in the lower surface of the base wall 362 directly below the inner side wall 364.

A plurality of openings 382 may be provided in the base wall 362 and extend from the inner surface to the first planar surface portion 376.

The fish tape 222 is wound within the outer side wall 366 of the lower reel part 352 and spooled within the cavity 374. The anchor end 232, 232' is proximate to the outer side wall 366. The pulling eye catch 230, 230' is proximate to the inner side wall 364.

The upper and lower reel parts 350, 352 are mated together to entrap the fish tape 222 within the cavity 374 of the lower reel part 352. When mated, the outer side wall 360 of the upper reel part 350 overlaps the outer side wall 366 of the lower reel part 352 such that the inner surface of the outer side wall 360 abuts against the outer surface of the outer side wall 366. The inner side wall 364 of the lower reel part 352 is spaced inwardly from the edge of the base wall 356 which forms the opening 358 of the upper reel part 350 such that a space 384 is formed therebetween when the storage reel 226 is viewed from above. The space 384 is in communication with the cavity 374. When viewed from above the storage reel 226, the intermediate wall 368 can be seen through the space 384. The pulling eye catch 230, 230' of the fish tape 222 and a portion of the fish tape body 228, 228' are passed through the space 384 and extended outwardly of the storage reel 226. As such, the fish tape 222 exits the storage reel 226 along its face near the inner diameter. Preferably, the anchor end 232, 232' is not mechanically anchored to the storage reel 226, however, the anchor end 232, 232' may be mechanically anchored to the storage reel 226.

The outer side walls 360, 366 have latching structure thereon which are used to connect the upper and lower reel parts 350, 352 together.

Figure 22:
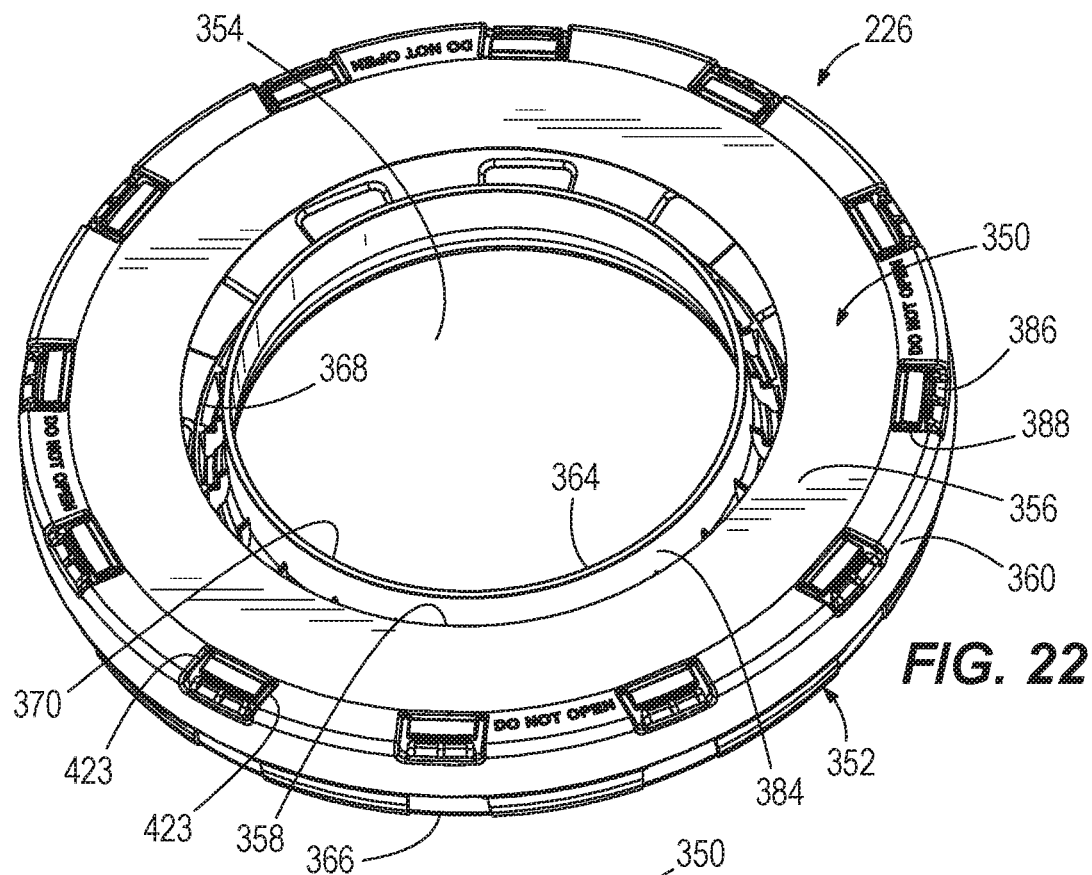
FIG. 22 depicts a perspective view of a storage reel of the fish tape case.

In an embodiment as shown in FIGS. 22-24, the lower reel part 352 has a plurality of flexible latch arms 386, each having a barb 387 on the free end thereof, extending upwardly from the outer side wall 366 and the upper reel part 350 has a plurality of openings 388 through the upper base wall 356. The upper base wall 356 further has a tab 389 extending into each opening 388 to define a smaller receiving opening 391 between the end of the tab 389 and the outer side wall 360 into which the barbed end of the respective latch arms 386 seats. When the upper and lower reel parts 350, 352 are mated together, the barbs 387 on the latch arms 386 slide along the inner surface of the outer side wall 360 and the latch arms 386 are flexed inwardly toward the center of the lower reel part 352. The barbs 387 on the latch arms 386 engage the underside of the tabs 389 and bias the tabs 389 upwardly. Once the barbs 387 pass by the tabs 389, the tabs 389 engage the opposite surfaces of the latch arms 386. Once the barbs 387 pass through the receiving openings 391, the latch arms 386 are biased outward by the tabs 389 and the barbs 387 engage with the upper end of the outer side wall 360 forming the respective opening 388, thereby causing a "snap-fit" of the upper and lower reel parts 350, 352 together. The tabs 389 add strength to the assembly of the upper and lower reel parts 350, 352. The upper and lower reel parts 350, 352 can be separated from each other by pulling the tabs 389 on the upper reel part 350 upward which causes the latch arms 386 to flex inward toward the center of the upper reel part 350. This action releases the barbs 387 from engagement with the upper end of the outer side wall 360. When the lower reel part 352 is then pulled away from the upper reel part 350, the barbs 287 pass through the openings 388 and engage with and slide along the inner surface of the outer side wall 360.

In another embodiment as shown in FIGS. 27-31, proximate to an upper end of the outer side wall 366 of the lower reel part 352, the outer side wall 366 has a plurality of upper barbs 390 extending outwardly therefrom and a lower barb 392 extending outwardly therefrom. The upper barbs 390 extend circumferentially around the outer circumference of the outer side wall 366 and are spaced apart from each other by portions 393 of the outer side wall 366. The lower barb 392 extends circumferentially and continuously from the outer side wall 366 around its outer circumference. Proximate to a lower end of the outer side wall 360 of the upper reel part 350, the outer side wall 360 has a plurality of lower mating recesses 395 in which the upper barbs 390 on the lower reel part 352 can seat within and an upper mating recess 397 in which the lower barb 392 on the lower reel part 352 can seat within. The lower mating recesses 395 extend circumferentially around the outer circumference of the outer side wall 366 and are spaced apart from each other by portions 399 of the outer side wall 360. The upper mating recess 397 extends circumferentially and continuously from the outer side wall 360 around its outer circumference. When the upper and lower reel parts 350, 352 are secured together, the upper barbs 390 seat within the lower mating recesses 395 and the lower barb 392 seats within the upper mating recess 397. The portions 399 of the outer side wall 360 abut against the portions 393 of the outer side wall 366. As a result, the upper and lower reel parts 350, 352 cannot rotate relative to each other. The outer side wall 366 of the lower reel part 352 has a plurality of breaks 401 which extend from the top end of the outer side wall 366 to the bottom end of the outer side wall 366 and which divides the outer side wall 366 into portions. This assists in the flexing of the lower reel part 352 when inserted into the upper reel part 350.

The latching structure may include a living hinge to maintain the upper and lower reel parts 350, 352 together at all times. Other latching structure are within the scope of the present disclosure, such as, for example, fasteners and adhesives.

The storage reel 226 seats within the reel receiving space 310 of the mated shell parts 240, 242 to form the fish tape case 220. When inserted, the central aperture 354 of the storage reel 226 encircles the intermediate wall 296 such that the third horizontal surface portion 380 of the base wall 362 of the storage reel 226 seats on the second bearing surface 304 of the lower shell part 242 and second vertical surface portion 378 of the base wall 362 of the storage reel 226 engages against third bearing surface 306 of the lower shell part 242. The blocking wall 286 passes through the space 384.

The upper shell part 240 can be assembled with the pulling eye catch 230, 230' of the fish tape 222 passed through the first fish tape outlet 270 or through the second fish tape outlet 272. Thereafter, the upper and lower shell parts 240, 242 are assembled with each other. The first fish tape outlet 270 may be better suited for use when the fish tape case 220 is placed in a horizontal position such that the fish tape 222 exits the fish tape case 220 perpendicular to a horizontal plane of the fish tape case 220. For example, if the fish tape case 220 is resting on the ground and the fish tape 222 is routed up through a conduit. Since the fish tape case 220 is resting on the ground, the user can use both hands to payout the fish tape 222 from the fish tape case 220.

When the upper shell part 240 is assembled with the lower shell part 242, the upper end 394 of the inner side wall 364 engages with the first bearing surface 262 of the upper shell part 240 such that the storage reel 226 is trapped between the bearings surfaces 262, 304, 306. The blocking wall 286 is above the intermediate wall 368 of the lower reel part 352 but does not engage with the intermediate wall 368. The blocking wall 286 closes a section of the space 384 from communication with the reel receiving space 310.

To initially position the fish tape 222 through the first fish tape outlet 270, the pulling eye catch 230, 230' on the fish tape body 228, 228' extending from the storage reel 226 is simply passed through the first fish tape outlet 270. Thereafter, the upper and lower shell parts 240, 242 are assembled with each other.

To initially position the fish tape 222 through the second fish tape outlet 272, the fish tape body 228, 228' extending from the inner diameter of the storage reel 226 is laid in the first portion 276 of the recess 274 proximate to the blocking wall 286 and extends past the blocking wall 286, is passed through the gap 256 in the intermediate wall 252, laid in the second portion 278 of the recess 274, and the pulling eye catch 230, 230' is seated within either the intermediate section 282 and against the inner shoulder 282a or the outer section 284 and against the outer shoulder 284a, depending upon what type of fish tape 222 is used and how large the pulling eye catch 230, 230' is. Thereafter, the upper and lower shell parts 240, 242 are assembled with each other. The recess 274 provides for the fish tape 222 to move from the inner diameter of the fish tape case 220 to the outer diameter of the fish tape case 220 in a controlled manner. The second fish tape outlet 272 is sized to prevent the anchor end 232, 232' from passing therethrough. This prevents the fish tape 222 from being fully pulled out of the fish tape case 220. The blocking wall 286 further assists in preventing the anchor end 232, 232' from sliding along the first portion 276 of the recess 274 when the fish tape 222 is being pulled out of the fish tape case 220; the anchor end 232, 232' may come into contact with the blocking wall 286 and wedge there against.

The fish tape 222 can be easily pulled out of the fish tape case 220 by the user simply grasping the pulling eye catch 230, 230' and/or by the gripping the fish tape body 228, 228' and pulling. The storage reel 226 freely spins within the shell 224 with only contact between the bearing surfaces 262 and the upper end 394 of the inner side wall 364, the bearing surface 304 and the third horizontal surface portion 380, and the bearing surface 306 and the second vertical surface portion 378. As shown, the bearing surface 304 is wavy, which reduces the contact area with the third horizontal surface portion 380 of the storage reel 226, however, the bearing surface 304 may be planar. The bearing surface 262 may also be wavy to reduce the contact area with the upper end 394 of the inner side wall 364.

Figure 32A:
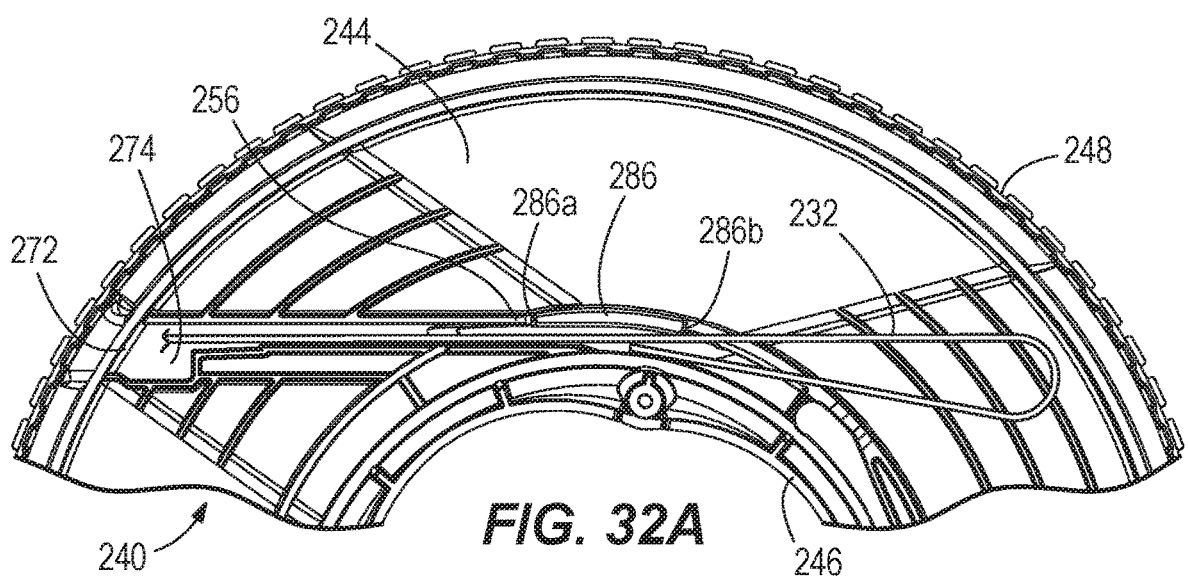
FIGS. 32A-32C depict partial bottom elevation views of the upper shell part having a fish tapes mounted therein.
Figure 32B:
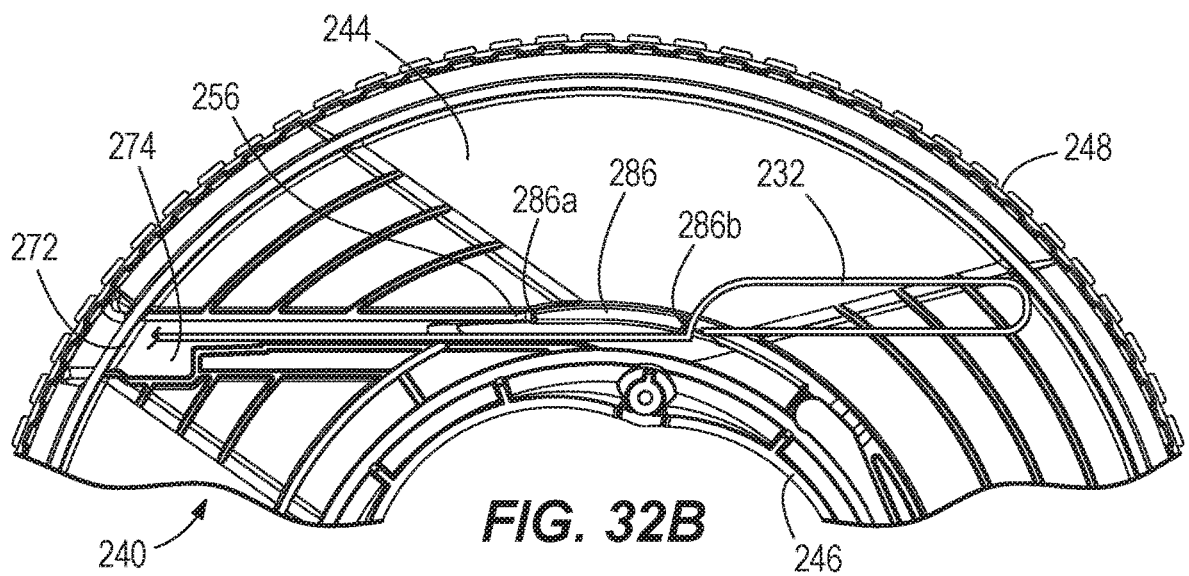
Figure 32C:
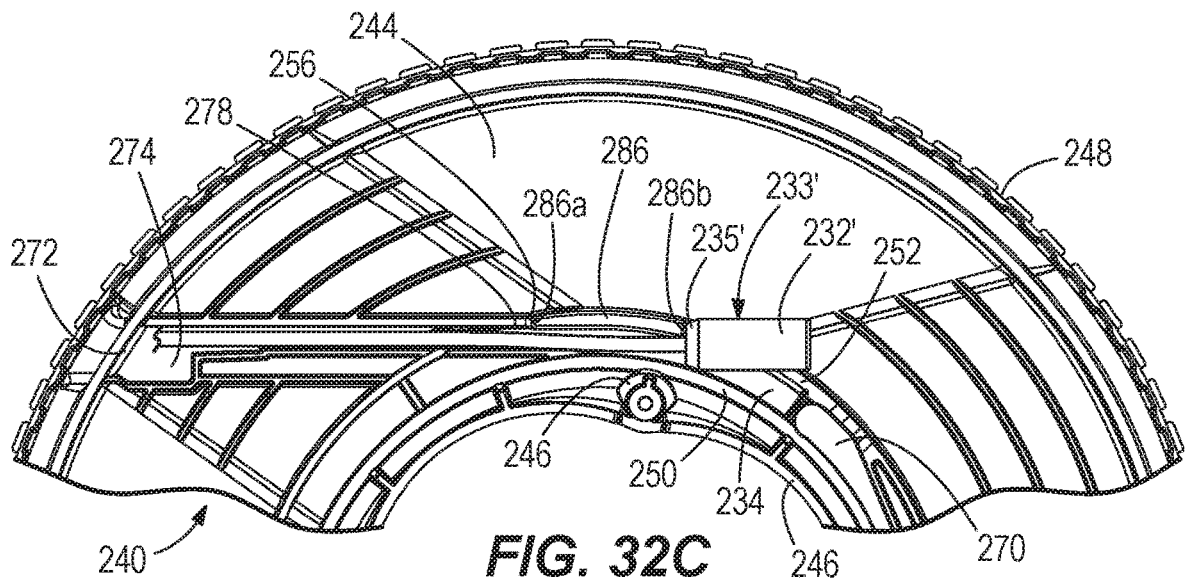
Figure 36:
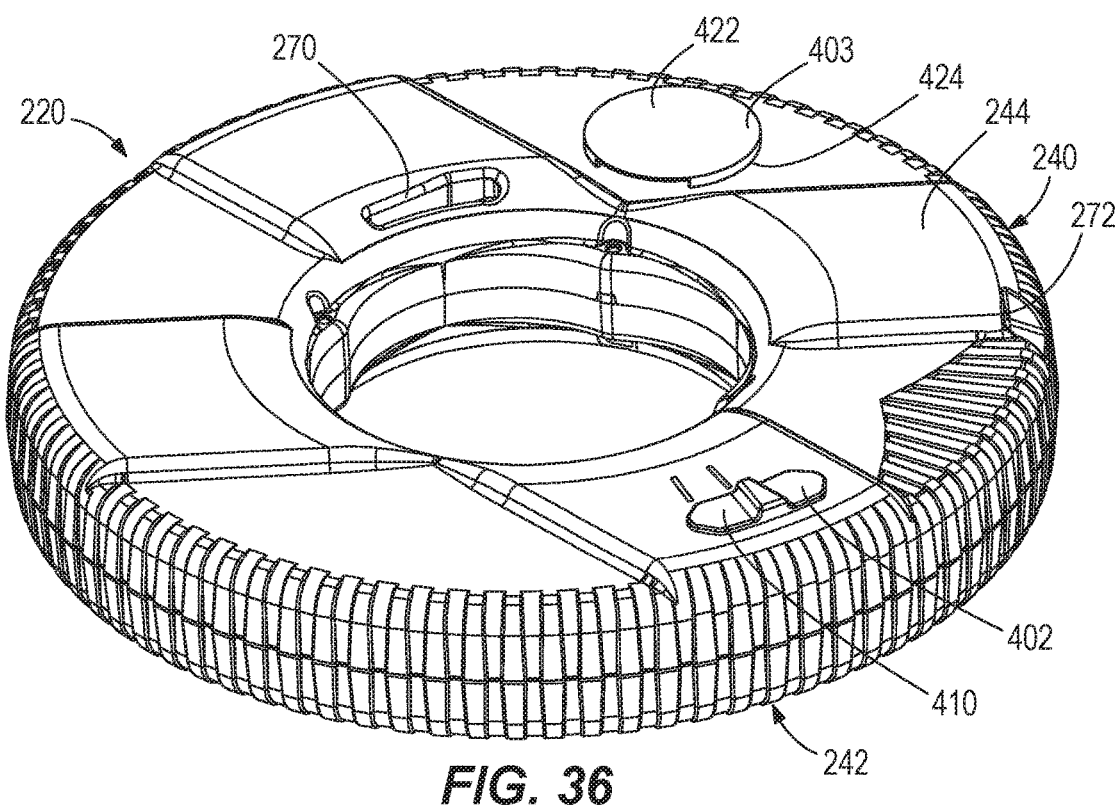
FIG. 36 depicts a perspective view of the fish tape case with embodiments of reel stoppers attached thereto.
Figure 37:
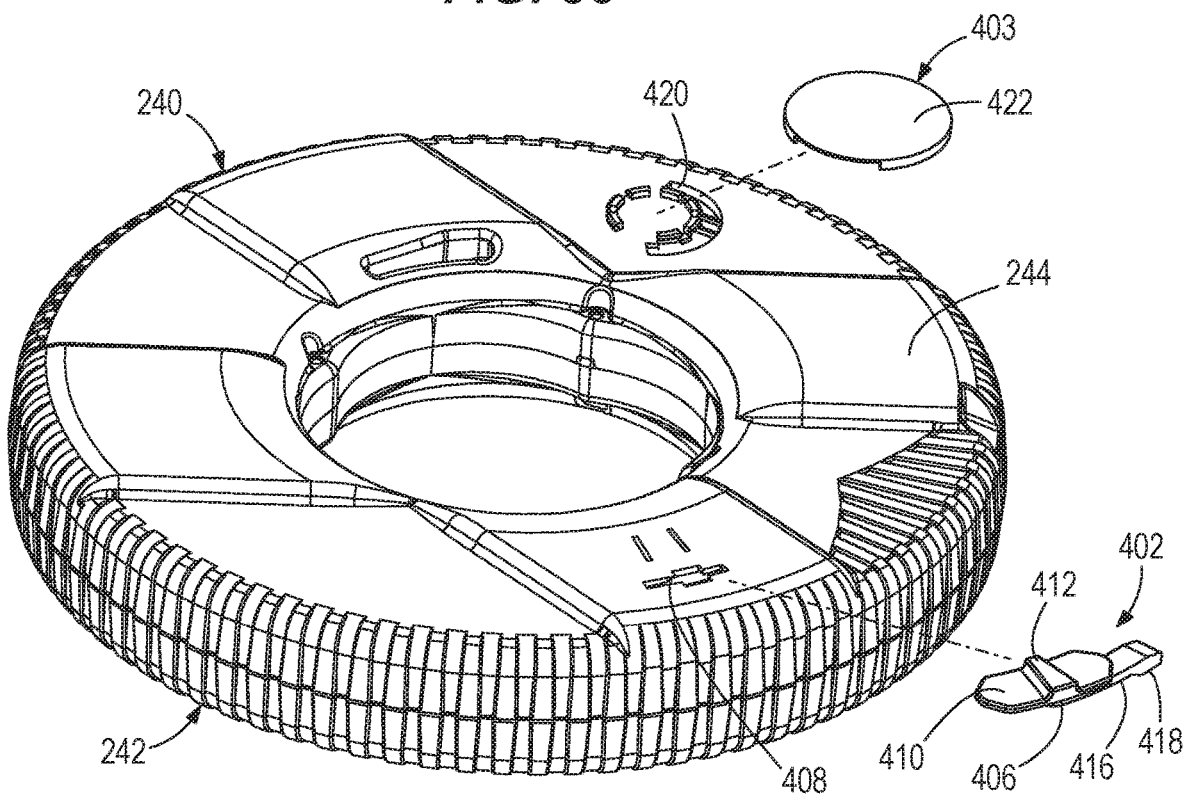
FIG. 37 depicts a perspective view of the fish tape case of FIG. 36 shown with the reel stoppers exploded therefrom.
Figure 38:
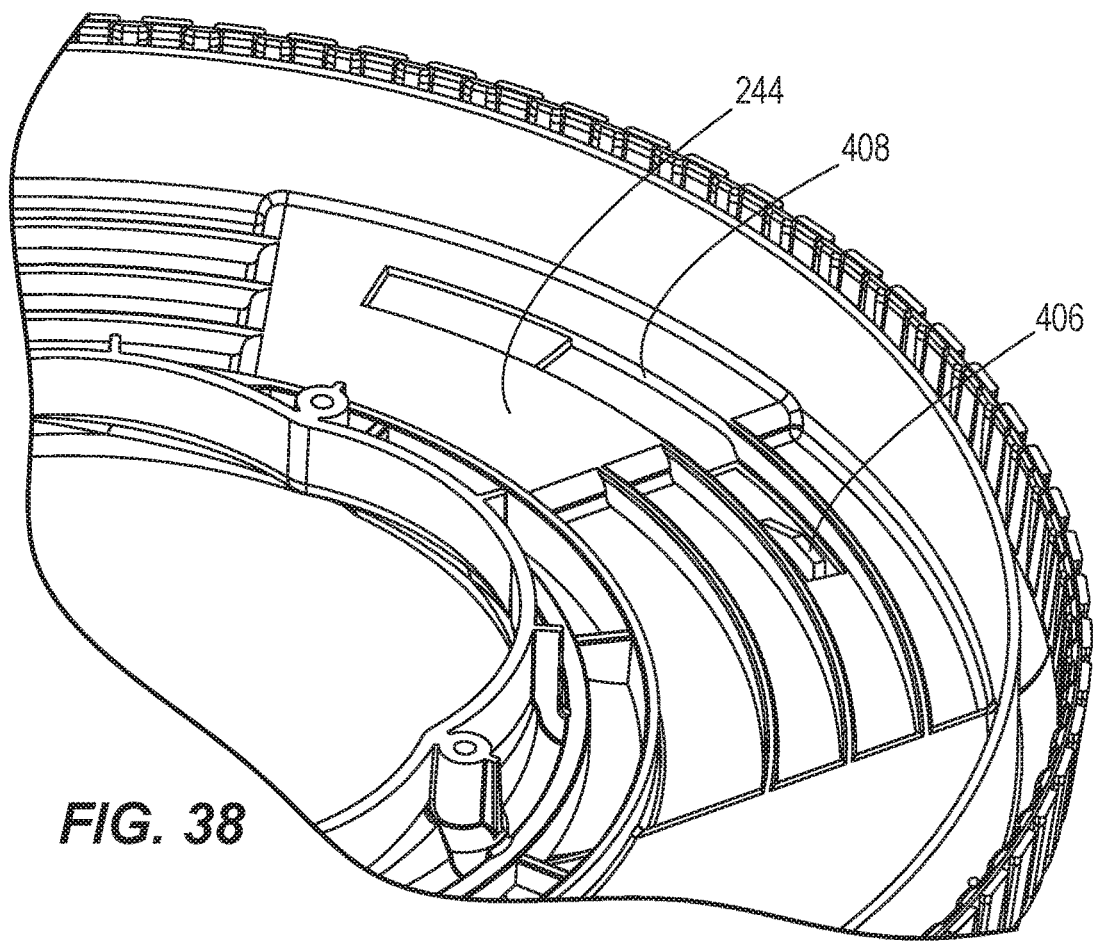
FIG. 38 depicts a partial perspective view of an upper shell part of the fish tape case of FIG. 36.
Figure 44:
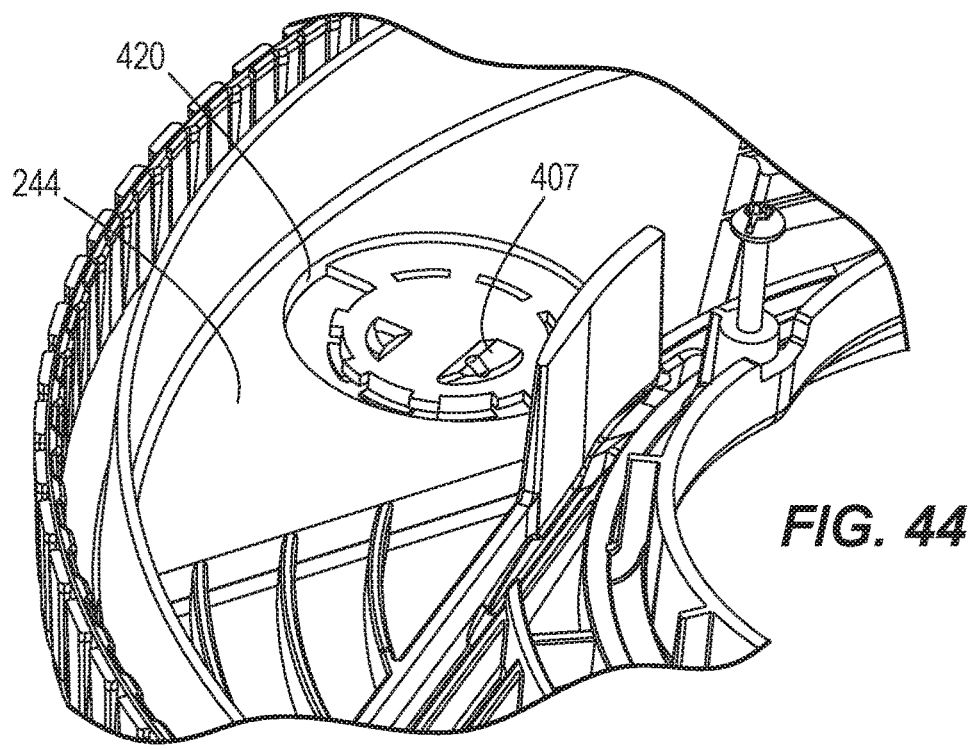
FIG. 44 depicts a partial perspective view of the upper shell part of FIG. 37.

As the fish tape 222 is fed out of the fish tape case 220 to the second fish tape outlet 272, the long body 228, 228' travels through the first portion 276 of the recess 274 and then to the second fish tape outlet 272. The anchor end 232, 232' comes into contact with the end 286b of the blocking wall 286 of the upper shell part 240 which deters the passage beyond the blocking wall 286, see FIGS. 32A-32C for examples. When the anchor end 232' of the fish tape 222 comes into contact with the end 286b of the blocking wall 286 of the upper shell part 240 and the inner side wall 364 of the storage reel 226, the chamfer formed by the frusto-conical portion 235' engages with the end 286b and the inner side wall 364 to deter the long body 228' from kinking or buckling when this engagement occurs.

The fish tape outlets 270, 272 and the anchor end 232, 232' are sized to prevent the anchor end 232, 232' from passing therethrough. This prevents the fish tape 222 from being fully pulled out of the fish tape case 220. The fish tape 222 can be easily pushed back into the fish tape case 220 by user exerting force on the fish tape 222 which causes the storage reel 226 to rotate within the shell 224. The fish tape 222 is push wound about the outer diameter of the coil of the fish tape 222. When the fish tape 222 is being pushed back into the fish tape case 220, the fish tape 222 may engage with the blocking wall 286; the blocking wall 286 thereby prevents the fish tape 222 from buckling as it is being pushed back into the fish tape case 220. The blocking wall 286 prevents the fish tape 222 from wedging between the storage reel 226 and the shell 224. The blocking wall 286 prevents the fish tape 222 from pushing on the outer diameter of the shell 224 outside of the storage reel 226 so that the fish tape 222 properly enters into the inner diameter of the storage reel 226.

When the fish tape 222 is pushed back into the fish tape case 220 when the second fish tape outlet 272 is being used, the shoulder 282a or 284a engages the pulling eye catch 230, 230' and prevents the pulling eye catch 230, 230' from moving past the shoulder 282a or 284a and into the inner section 280 of the recess 274. The pulling eye catch 230, 230' is at least partially recessed into the shell part 240 when positioned against the shoulder 282a or 284a. This serves to protect the pulling eye catch 230, 230' during transport.

The storage reel 226 moves independently of the shell 224 and rotates as the user pulls the fish tape 222 out or pushes the fish tape 222 back into the shell 224. This allows the fish tape 222 to recoil to the same diameter every time by nesting in the storage reel 226. Reducing the force required to reel in and pay out fish tape 222 reduces the amount of strain placed on the user. By utilizing the storage reel 226 inside the shell, this fish tape case 220 of the present disclosure eliminates a lot of the friction that occurs when trying to reel in and pay out the fish tape 222.

The bearing surfaces 262, 304, 306 provide for very low friction between the shell 224 and the storage reel 226 such that the storage reel 226 spins substantially freely within the shell 224. In addition, the bearing surfaces 262, 304, 306 allow for the fish tape case 220 to be oriented in any direction and have the storage reel 226 still freely spinning. For example, the fish tape case 220 can be positioned with its lower shell part 242 on a horizontal surface, its upper shell part 240 on the horizontal surface, in a vertical orientation, or at any angle therebetween. Reducing the friction makes pulling and pushing the fish tape 222 less fatiguing for the user and thus more ergonomic.

The user can easily switch from the first fish tape outlet 270 to the second fish tape outlet 272 by separating the upper and lower shell parts 240, 242, removing the storage reel 226 such that the fish tape 222 is removed from the first fish tape outlet 270, and directing the fish tape 222 to the second fish tape outlet 272. The user can easily switch from the second fish tape outlet 272 to the first fish tape outlet 270 by separating the upper and lower shell parts 240, 242, such that the fish tape 222 is removed from the second fish tape outlet 272, and directing the fish tape 222 to the first fish tape outlet 270.

Since the shell 224 does not rotate, a user can set the fish tape case 220 onto a stationary surface and the fish tape 222 can be dispensed from either fish tape outlet 270, 272. The user can use both hands to extend and retract the fish tape 222. This is an improvement over prior art fish tapes which required the user to hold the fish tape case in one hand and to use the other hand to feed the fish tape out from the case.

The provision of the second fish tape outlet 272 on outer diameter of the fish tape case 220 allows the fish tape case 220 to be used equally well by both left-handed and right-handed users. No user has to reach around a front of the fish tape case 220 to access the second fish tape outlet 272. In addition, when the second fish tape outlet 272 is used, the user can easily switch from holding the fish tape case 220 in his/her right hand to his/her left hand without having to rotate the fish tape case 220. This can be done even in an instance where a large quantity of fish tape 222 has been fed out of the fish tape case 220 since the fish tape 222 will not be twisted when the user switches hands. This provides another ergonomic feature of the fish tape case 220.

In some embodiments, as shown in FIGS. 33A and 33B, the fish tape case 220 is carried in a kangaroo pouch 396 which can be carried on the front or back of the user. The use of the kangaroo pouch 396 allows for the user to be able to use both hands when the fish tape 222 is passed through the first fish tape outlet 270. The kangaroo pouch 396 allows the user to easily transport the fish tape case 220 to and from a worksite.

In some embodiments, as shown in FIG. 34, the fish tape case 220 includes attachment pins on the outer diameter thereof to which a strap 398 is attached for carrying the fish tape case 220. The strap 398 is passed over the user's shoulder such that the fish tape case 220 rests against the side of the user. The use of the strap 398 allows for the user to be able to use both hands when the fish tape 222 is passed through the second fish tape outlet 272. The strap 398 allows the user to easily transport the fish tape case 220 to and from a worksite.

In some embodiments, as shown in FIG. 35, the fish tape case 220 includes a handle 400. The user may hold the handle 400 in one hand and use the other hand to extend and retract the fish tape 222 from either fish tape outlet 270, 272. The handle 400 allows the user to easily transport the fish tape case 220 to and from a worksite.

In some embodiments, the fish tape case 220 does not include a handle as is commonly provided on prior art fish tape cases. With a handle, a user may misinterpret how to hold the fish tape case 220, and work in an awkward, fatiguing posture. The rigidity of the fish tape case 220 and the lifetime of the fish tape case 220 is improved without a handle, since the handle is the component that typically wears out first. Without a handle, users are encouraged to hold the bulk of the weight of the fish tape case 220 in their power zone, close to their center of mass. Without a handle, it is more natural to place one hand on the outer diameter of the shell 224 and rest most of the weight of the fish tape case 220 on their hip, cradling the fish tape case 220 between their arm and body. This reduces unnecessary muscle activation and potential fatigue. Furthermore, the removal of the handle reduces the overall footprint of the fish tape case 220 which reduces the cost of shipping by saving box space.

Because the connection between the shell 224 and the storage reel 226 provides very low friction such that the storage reel 226 spins substantially freely in the shell 224, the fish tape 222 pays out easily when the fish tape 222 is pulled out of the fish tape case 220 by the user. In order to prevent the storage reel 226 from spinning in certain circumstances, such as for example when the fish tape case 220 is being transported between locations, a storage reel stopper 402, 402' 403, 404, see FIGS. 35-46, may be provided.

In embodiments as shown in FIGS. 33-45, the storage reel stopper 402, 402', 403 is movably mounted on the base wall 244 of the upper shell part 240 and engages with a ramp surface 406, 407 on the lower surface of the base wall 244 which biases the storage reel stopper 402 into engagement with the upper surface of the upper base wall 356 of the upper reel part 350 of the storage reel 226.

As shown in the embodiments of FIGS. 33-41, the storage reel stopper 402, 402' is slidable relative to the upper shell part 240.

The base wall 244 of the upper shell part 240 has an elongated opening 408 provided therethrough. The opening 408 is in communication with the outer cavity 268 of the upper shell part 240. The opening 408 may be curved along a radius line or may be linear. The ramp surface 406 is proximate to an end of the opening 408 but spaced therefrom.

Figure 39:
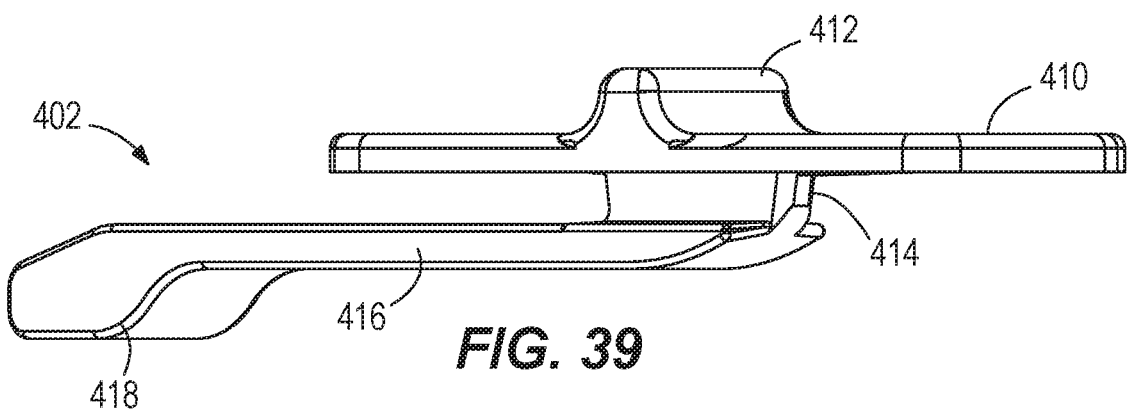
FIGS. 39 and 40 depict plan views of embodiments of reel stoppers.

The storage reel stopper 402 of FIG. 39 has a horizontal upper portion 410 which has a finger engaging projection 412 extending upwardly therefrom, an intermediate necked down portion 414 extending vertically downwardly from the upper portion 410, and a lower portion 416 extending from a lower end of the intermediate necked down portion 414. The intermediate portion 414 can be flexed to move the lower portion 416 away from the upper portion 410 when the lower portion 416 engages with the ramp surface 406. When unflexed, the lower portion 416 is generally parallel to the upper portion 410. The lower portion 416 has a head 418 at the free end thereof which extends in the downward direction.

The upper portion 410 overlays the upper surface of the base wall 244, the intermediate necked down portion 414 extends through the elongated opening 408, and the lower portion 416 is proximate to, and may engage with, the lower surface of the base wall 244. When the storage reel 226 is mounted within the reel receiving space 310, the head 418 of the storage reel stopper 402 faces the upper surface of the base wall 356 of the upper reel part 350. The upper portion 410 is larger than the opening 408 so that the upper portion 410 cannot pass through the opening 408.

In a free position during which fish tape 222 is to be paid out, the storage reel stopper 402 is positioned such that the lower portion 416 is not engaged with the ramp surface 406. In this position, the head 418 is spaced from the upper surface of the base wall 356 of the upper reel part 350 and the storage reel 226 can freely rotate within the shell 224. When it is desired to prevent the storage reel 226 from rotating within the shell 224, the user grips the finger engaging protrusion 412 and slides the storage reel stopper 402 toward the ramp surface 406 to a hold position. The upper surface of the base wall 244 of the upper shell part 240 may have suitable markings thereon to indicate the free position and the hold position to the user. When the upper surface of the lower portion 416 engages with the ramp surface 406, the lower portion 416 is biased away from the upper portion 410 and toward the upper surface of the base wall 356 of the upper reel part 350. When the storage reel stopper 402 is sufficiently slid relative to the upper shell part 240, the head 418 engages with, and is wedged between, the upper surface of the base wall 356 of the upper reel part 350 and the ramp surface 406 to frictionally engage the head 418 with the base wall 356. The frictional engagement prevents rotational movement of the storage reel 226 relative to the shell 224. To move the storage reel stopper 402 back to the free position, the user slides the storage reel stopper 402 in the opposite direction and back to the free position. During this movement, the head 418 is withdrawn from engagement between the base wall 356 and the ramp surface 406. As the storage reel stopper 402 is slid toward the free position, the head 418 slides along the ramp surface 406 and the lower portion 416 returns to its unflexed condition.

Figure 40:
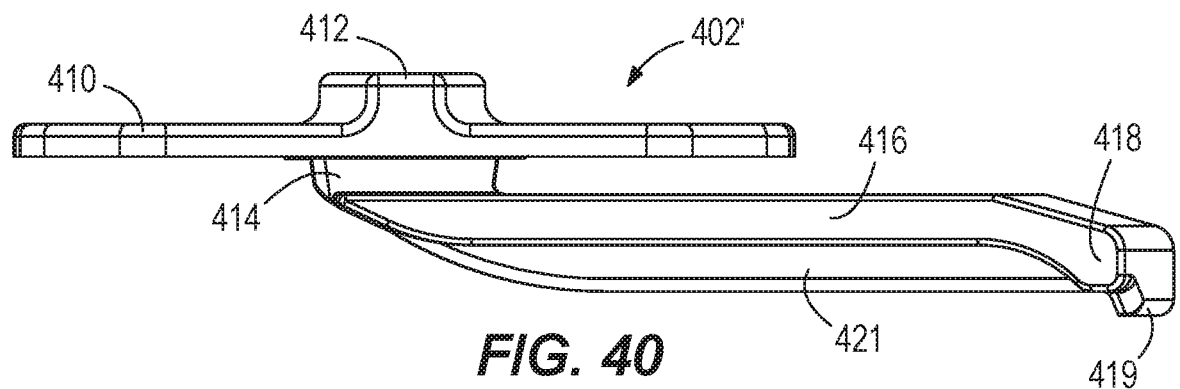
Figure 41:
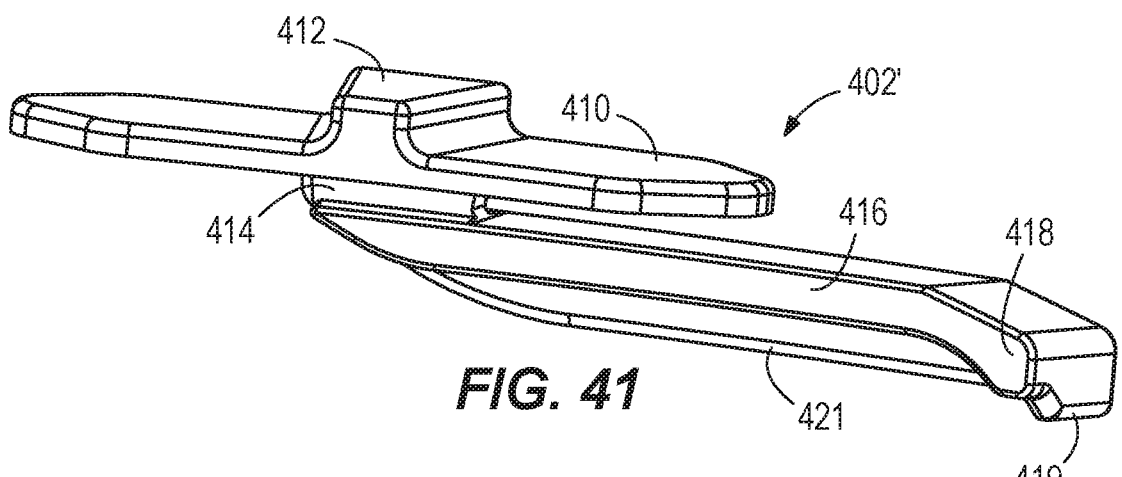
FIG. 41 depicts a perspective view of the reel stopper of FIG. 37.
Figure 42:
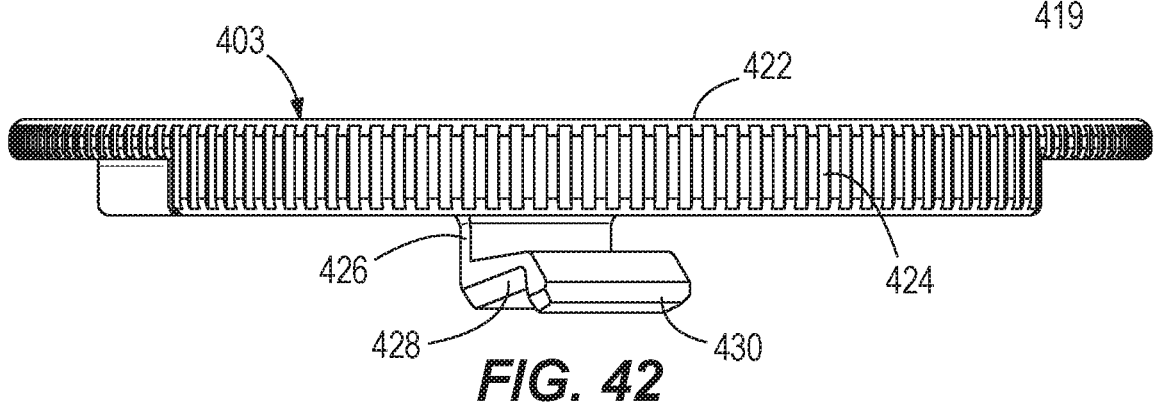
FIG. 42 depicts a plan views of another embodiment of the reel stopper.
Figure 43:
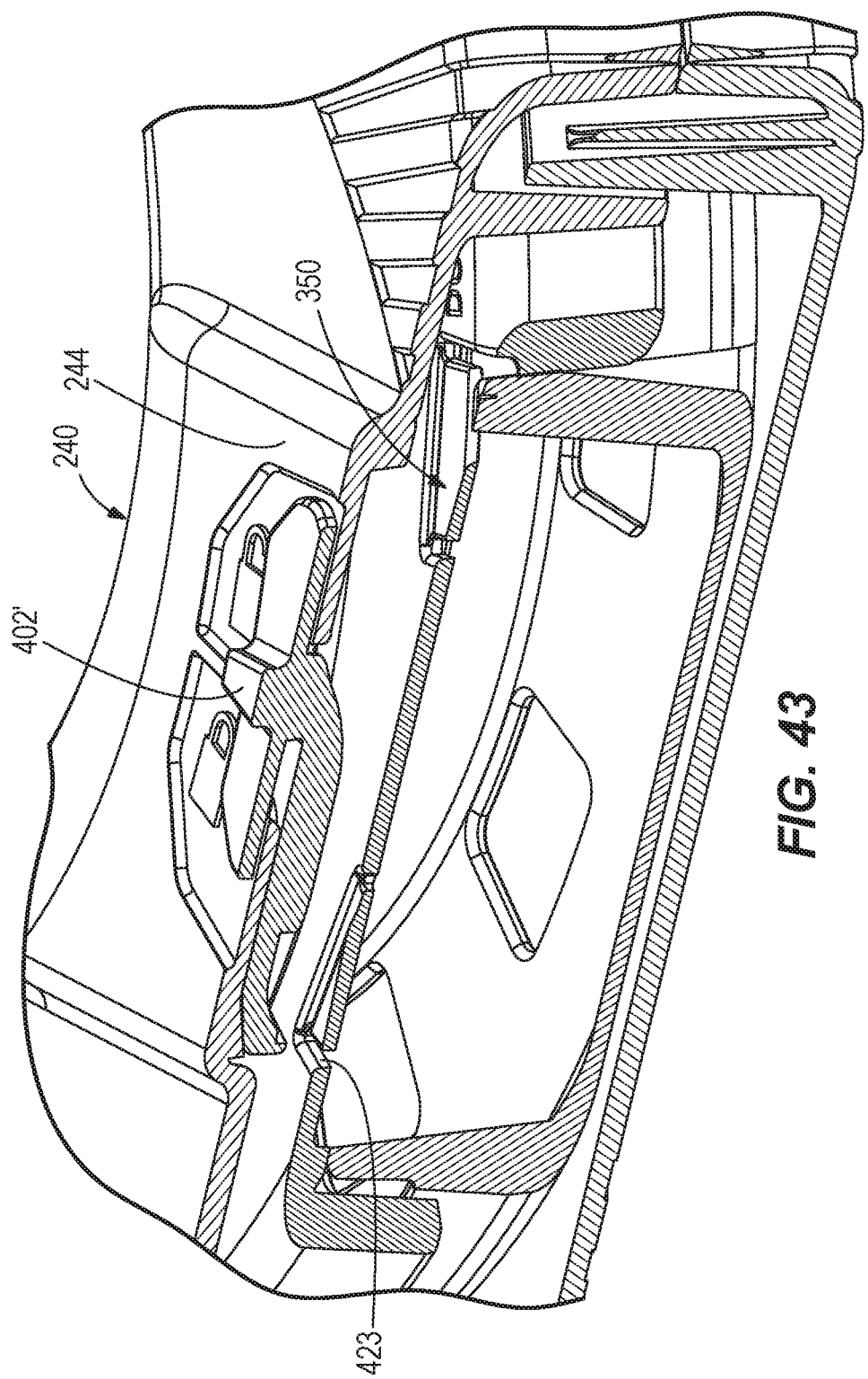
FIG. 43 depicts a partial cross-sectional view of an embodiment of the fish tape case having the reel stopper of FIG. 37 attached thereto.
Figure 45:
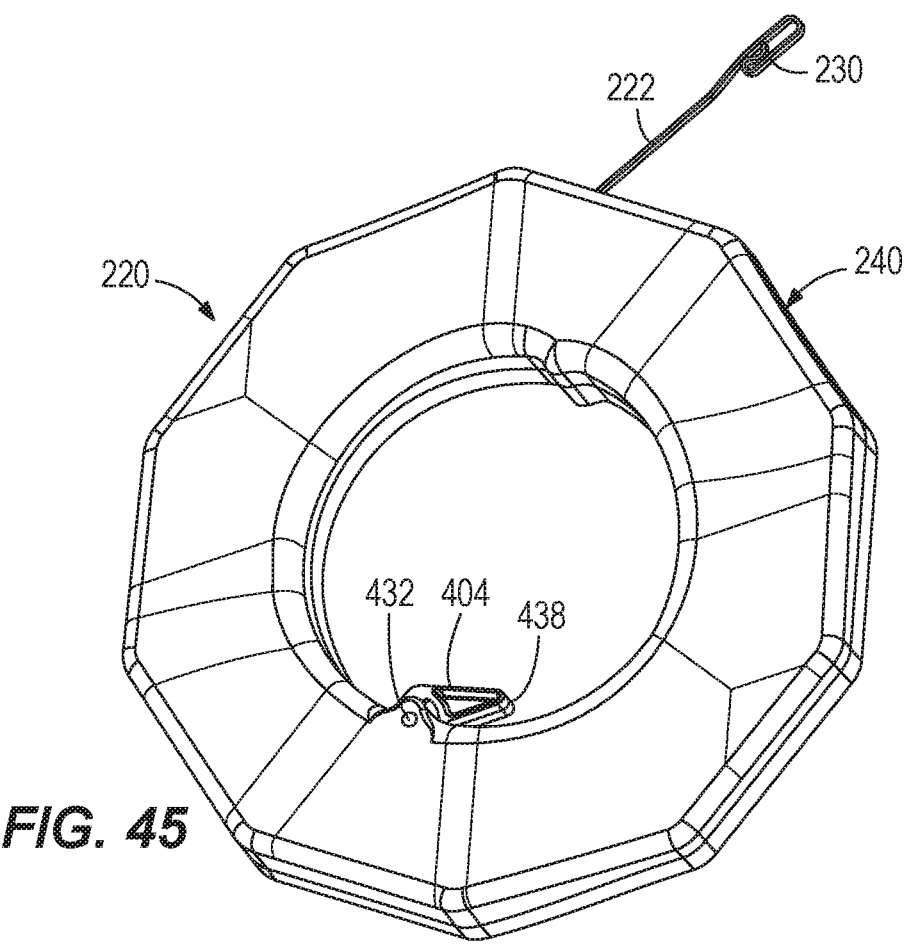
FIG. 45 depicts a perspective view of another embodiment of a reel stopper which can be used with the fish tape case.

The storage reel stopper 402' of FIGS. 40 and 41 adds a finger 419 which extends downwardly from the head 418 and a reinforcing rib 421 which extends downwardly from the lower portion 416 to the head 418. The intermediate portion 414 can be flexed to move the lower portion 416 away from the upper portion 410 when the lower portion 416 engages with the ramp surface 406 to engage the finger 419 with a space 423, see FIGS. 43 and 44, through the upper base wall 356 when the storage reel stopper 402' is slid to the locked position. To move the storage reel stopper 402' from the locked position to the unlocked position, the operator presses on the upper portion 410 which is opposite to the head 418 to tilt the finger 419 out of the space 423 so that the storage reel stopper 402' can be slid.

As shown in the embodiment of FIGS. 36, 37, 42 and 45, the storage reel stopper 403 is rotatable relative to the upper shell part 240. The storage reel stopper 403 rotates around an axis which is parallel to the axis 236 of the fish tape case 220.

The base wall 244 of the upper shell part 240 has an elongated opening 420 provided therethrough which follows along at least a part of a circle. The opening 420 is in communication with the outer cavity 268 of the upper shell part 240. The ramp surface 407 is within the circumference of the circle of the opening 420.

The storage reel stopper 403 has a horizontal upper portion 422 which may be circular and may have finger engaging ridges 424 on a perimeter thereof, an intermediate necked down portion 426 extending vertically downwardly from the upper portion 422, and a lower portion 428 extending from a lower end of the intermediate necked down portion 426. The intermediate portion 426 can be flexed to move the lower portion 428 away from the upper portion 422 when the lower portion 428 engages with the ramp surface 407. When unflexed, the lower portion 428 is generally parallel to the upper portion 422. The lower portion 428 has a head 430 at the free end thereof which extends in the downward direction.

The upper portion 422 overlays the upper surface of the base wall 244, the intermediate necked down portion 426 extends through the opening 420, and the lower portion 428 is proximate to, and may engage with, the lower surface of the base wall 244. When the storage reel 226 is mounted within the reel receiving space 310, the head 430 of the storage reel stopper 403 faces the upper surface of the base wall 356 of the upper reel part 350. The upper portion 422 is larger than the opening 420 so that the upper portion 422 cannot pass through the opening 420.

In a free position during which fish tape 222 is to be paid out, the storage reel stopper 403 is positioned such that the lower portion 428 is not engaged with the ramp surface 407. In this position, the head 430 is spaced from the upper surface of the base wall 356 of the upper reel part 350 and the storage reel 226 can freely rotate within the shell 224. When it is desired to prevent the storage reel 226 from rotating within the shell 224, the user grips the finger engaging ridges 424 and rotates the storage reel stopper 403 toward the ramp surface 407 to a hold position. The upper surface of the base wall 244 of the upper shell part 240 may have suitable markings thereon to indicate the free position and the hold position to the user. When the upper surface of the lower portion 428 engages with the ramp surface 407, the lower portion 428 is biased away from the upper portion 422 and toward the upper surface of the base wall 356 of the upper reel part 350. When the storage reel stopper 403 is sufficiently rotated relative to the upper shell part 240, the head 430 engages with, and is wedged between, the upper surface of the base wall 356 of the upper reel part 350 and the ramp surface 407 to frictionally engage the head 430 with the base wall 356. The frictional engagement prevents rotational movement of the storage reel 226 relative to the shell 224. To move the storage reel stopper 403 back to the free position, the user rotates the storage reel stopper 403 in the opposite direction and back to the free position. During this movement, the head 430 is withdrawn from engagement between the base wall 356 and the ramp surface 407. As the storage reel stopper 403 is rotated toward the free position, the head 430 slides along the ramp surface 407 and the lower portion 428 returns to its unflexed condition.

Figure 46:
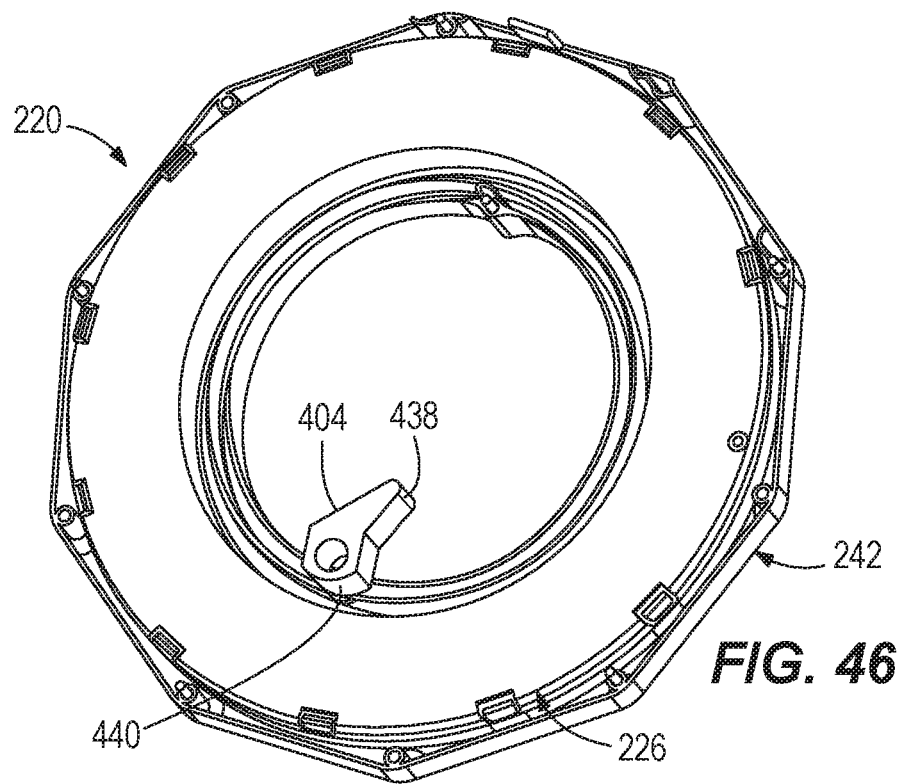
FIG. 46 depicts a perspective view of a lower shell part of the fish tape case of FIG. 45 with the reel stopper attached thereto.
Figure 47:
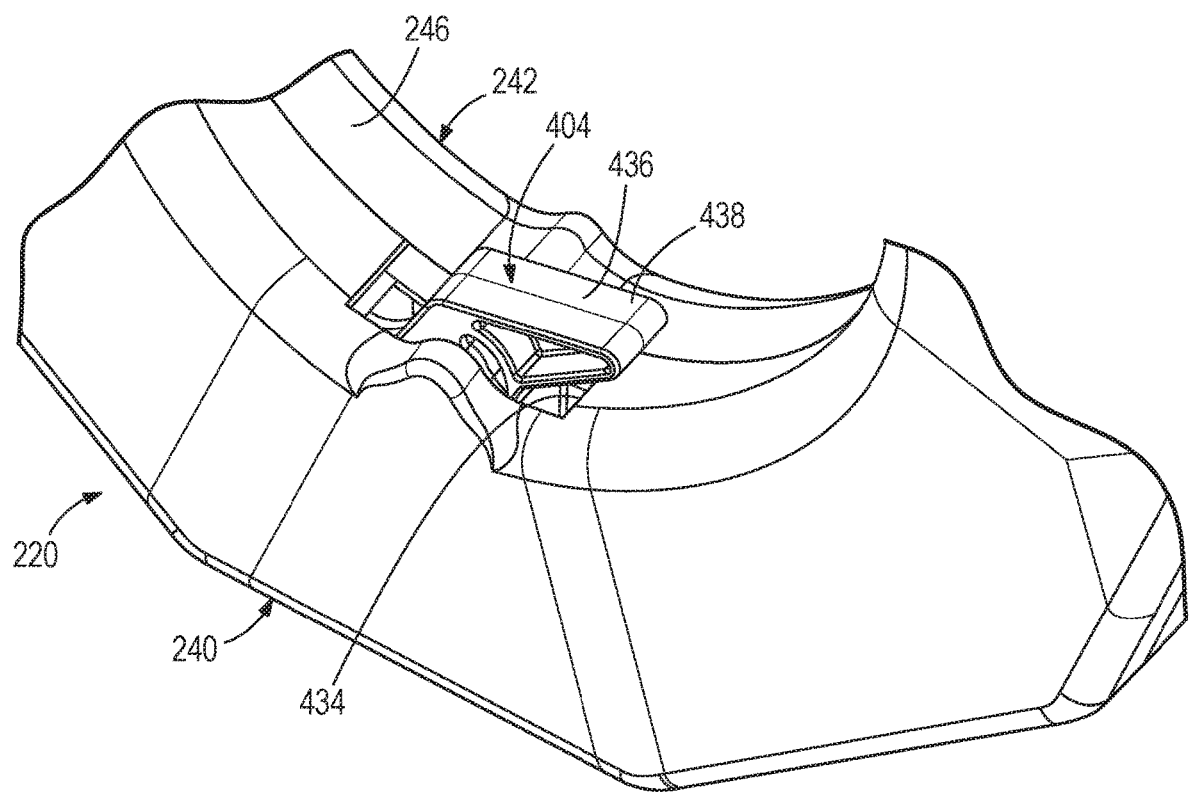
FIG. 47 depicts a partial perspective view of the fish tape case of FIG. 45 with the reel stopper attached thereto.

As shown in the embodiment of FIGS. 46-48, the storage reel stopper 404 is rotatable relative to the outer shell 224 and to the storage reel 226. The storage reel stopper 404 rotates around a pivot pin 432 which defines an axis which is parallel to the axis 236.

In this embodiment, the pivot pin 432 is affixed to the upper and lower shell parts 240, 242 along the inner diameters thereof. An opening 434 is provided through the inner side wall 246 and/or 292 of at least one of the shell parts 240, 242 through which the storage reel stopper 404 extends. The storage reel stopper 404 has a body 436 having a finger engaging portion 438 at one end thereof and a head 440 at the other end thereof. The head 440 has a cam surface which can be rotated into engagement with the storage reel 226 to wedge into engagement with and to frictionally engage the head 440 with the storage reel 226. The head 440 engages with the inner side wall 364 of the storage reel 226. The frictional engagement prevents rotational movement of the storage reel 226 relative to the shell 224.

In a free position during which fish tape 222 is to be paid out, the storage reel stopper 404 is positioned such that the head 440 is not engaged with the inner side wall 364 of the storage reel 226. In this position, the head 440 is spaced from the inner side wall 364 and the storage reel 226 can freely rotate within the shell 224. When it is desired to prevent the storage reel 226 from rotating within the shell 224, the user grips the finger engaging portion 438 and rotates the storage reel stopper 404 around the pivot pin 432 until the head 440 frictionally engages with the inner side wall 364. The upper shell part 240 may have suitable markings thereon to indicate the free position and the hold position to the user. The frictional engagement prevents rotational movement of the storage reel 226 relative to the shell 224. To move the storage reel stopper 404 back to the free position, the user rotates the storage reel stopper 404 in the opposite direction and back to the free position. During this movement, the head 440 is withdrawn from engagement with the inner side wall 364.

The storage reel 226 and fish tape 222 mounted therein can be easily and quickly changed by a user in the event that the storage reel 226 and/or the fish tape 222 becomes worn. The upper and lower shell parts 240, 242 are detached from each other and the storage reel 226 and fish tape 222 mounted therein are removed. A new storage reel 226 and fish tape 222 are positioned within the lower shell part 242, the fish tape 222 is routed through the desired fish tape outlet 270, 272 and the upper shell part 240 is reattached. As a result, the user does not have to directly handle the fish tape 222 prior to routing the fish tape 222 to the desired fish tape outlet 270, 272; the user only handles the fish tape 222 when routing the fish tape 222 to the desired fish tape outlet 270, 272.

One of the shell parts 240, 242, for example, the lower shell part 242 may have a plurality of small holes 442, see FIG. 14, provided therethrough proximate to the bearing surfaces 262, 304, 306. These small holes 442 allow a user to spray lubricant into the shell 224 and onto the bearing surfaces 262, 304, 306 to improve the spinning of the storage reel 226 within the shell 224. The shell parts 240, 242 may be dissembled for cleaning. Furthermore, the small holes 442 act as a drainage relief in the event that fluids get into the fish tape case 220.

Many modifications and other embodiments of the disclosure set forth herein will come to mind to one skilled in the art to which these disclosed embodiments pertain having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A fish tape case configured to house a fish tape, the fish tape case comprising:
 a shell having an upper base wall, a lower base wall, an inner side wall extending between inner perimeters of the base walls and forming a central aperture through the shell through which a hand of a user can extend, an outer side wall extending between outer perimeters of the base walls and defining an outer diameter of the shell, the upper and lower base walls and the inner and outer side walls defining a cavity therein, the upper base wall having a first opening therethrough in direct communication with the cavity through which the fish tape is configured to exit in a first orientation, the first opening being between the inner and outer side walls, and the outer side wall having a second opening therethrough in direct communication with the cavity through which the fish tape is configured to exit in a second orientation.

2. The fish tape case of claim 1, further comprising a storage reel in which the fish tape is configured to be seated, the storage reel being within the cavity, the storage reel having an upper base wall, a lower base wall, an inner side wall extending from an inner perimeter of the lower base wall and forming a central aperture through the storage reel, an outer side wall extending between outer perimeters of the base walls and defining an outer diameter of the storage reel, the upper and lower base walls and the inner and outer side walls of the storage reel defining a cavity therein, the inner side wall of the storage reel being spaced from the upper base wall of the storage reel to define an opening extending around the storage reel through which the fish tape is configured to exit the storage reel and pass into the cavity of the shell.

3. The fish tape case of claim 2, wherein the shell further comprises a recess in a lower surface of the upper base wall which faces the cavity of the shell, the recess being in communication with the first and second openings in the shell.

4. The fish tape case of claim 3, wherein the recess is partially aligned with the opening in the storage reel.

5. The fish tape case of claim 3, wherein the shell further comprises a blocking wall extending from the upper base wall and into the cavity of the shell proximate to the recess, the blocking wall extending through the opening of the storage reel and into the cavity of the storage reel, wherein the fish tape is configured to contact the blocking wall.

6. The fish tape case of claim 1, wherein the shell further comprises a blocking wall extending into the cavity of the shell, wherein the fish tape is configured to contact the blocking wall.

7. The fish tape case of claim 6 in combination with the fish tape within the shell, the fish tape comprising an elongate flexible body having a pulling eye catch on a first end and an enlarged end at a second opposite end, wherein the body is spooled with the pulling eye catch on an inner diameter of the coil and the enlarged end on an outer diameter of the coil, wherein the enlarged end has a dimension which is greater than the first and second openings.

8. The combination of claim 7, wherein the enlarged end of the fish tape includes a closed loop or is cylindrical.

9. The fish tape case of claim 1, wherein the first opening is generally tear-drop shaped.

10. The fish tape case of claim 1, wherein the first opening has a wider opening portion connected to a narrow opening portion.

11. The fish tape case of claim 1, wherein the first opening has a curved first wall surface which generally extends along a radial line extending from a center of the opening of the shell, a semi-circular second wall surface extending from a first end of the first wall surface, a linear third wall surface extending from an outer end of the second wall surface and extending generally parallel to the first wall surface, a fourth wall surface extending from a second end of the third wall surface and angling toward the first wall surface, and a semi-circular fifth wall surface at second ends of the first and fourth wall surfaces.

12. The fish tape case of claim 1, wherein the first opening and the second opening have different shapes.

13. The fish tape case of claim 1, wherein a lower surface of the upper base wall has a recess proximate to the second opening, the recess forming a shoulder in the lower surface of the upper base wall.

14. The fish tape case of claim 13 in combination with the fish tape, the fish tape comprising an elongate flexible body having a pulling eye catch configured to seat within the recess, and the shoulder prevents the pulling eye catch from entering into the cavity.

15. The fish tape case of claim 1, wherein the shell is formed from an upper shell part and a lower shell part, wherein the upper shell part comprises the upper base wall and upper portions of the inner and outer side walls, and the lower shell part comprises the lower base wall and lower portions of the inner and outer side walls, wherein the second opening is formed through the upper portion of the outer side wall.

16. The fish tape case of claim 1 in combination with the fish tape within the shell, the fish tape comprising an elongate flexible body having a pulling eye catch on an end thereof, wherein the pulling eye catch extends from the first opening when the fish tape is positioned within the shell to exit through the first opening, and wherein the pulling eye catch extends from the second opening when the fish tape is positioned within the shell to exit through the second opening.

17. An assembly comprising:
a fish tape case including a shell having an upper base wall, a lower base wall, an inner side wall extending between inner perimeters of the base walls and forming a central aperture through the shell, an outer side wall extending between outer perimeters of the base walls and defining an outer diameter of the shell, the upper and lower base walls and the inner and outer side walls defining a cavity therein, the upper base wall having a first opening therethrough in communication with the cavity, and the outer side wall having a second opening therethrough in communication with the cavity through which the fish tape; and
a fish tape within the shell, the fish tape comprising an elongate flexible body having a pulling eye catch on an end thereof, wherein the pulling eye catch extends from the first opening when the fish tape is positioned within the shell to exit through the first opening, and wherein the pulling eye catch extends from the second opening when the fish tape is positioned within the shell to exit through the second opening.

18. The assembly of claim 2, wherein the first opening has a wider opening portion connected to a narrow opening portion, wherein the pulling eye catch is configured to pass through the wider opening portion but is not configured to pass through the narrow opening portion, and wherein a lower surface of the upper base wall has a recess proximate to the second opening, the recess forming a shoulder in the lower surface of the upper base wall against which the pulling eye catch is configured to engage.

19. An assembly comprising:
a fish tape case comprising:
a shell having an upper base wall, a lower base wall, an inner side wall extending between inner perimeters of the base walls and forming a central aperture through the shell, an outer side wall extending between outer perimeters of the base walls and defining an outer diameter of the shell, the upper and lower base walls and the inner and outer side walls defining a cavity therein, the upper base wall having a first opening therethrough in communication with the cavity through which the fish tape is configured to exit in a first orientation, and the outer side wall having a second opening therethrough in communication with the cavity through which the fish tape is configured to exit in a second orientation, a recess in a lower surface of the upper base wall which faces the cavity of the shell, the recess being in communication with the first and second openings, and a blocking wall extending from the upper base wall and into the cavity thereof proximate to the recess, and
a storage reel within the cavity, the storage reel having an upper base wall which is proximate to the upper base wall of the shell, a lower base wall which is proximate to the lower base wall of the shell, an inner side wall extending from an inner perimeter of the lower base wall of the storage reel and forming a central aperture through the storage reel, the inner side wall of the storage reel being proximate to the inner side wall of the shell, an outer side wall extending between outer perimeters of the base walls and defining an outer diameter of the storage reel, the outer side wall of the storage reel being proximate to the outer side wall of the shell, the upper and lower base walls and the inner and outer side walls of the storage reel defining a cavity therein, the inner side wall of the storage reel being spaced from the upper base wall of the storage reel to define an opening extending around the storage reel, wherein the recess is partially aligned with the opening in the storage reel and the blocking wall extends through the opening of the storage reel and into the cavity of the storage reel; and
a fish tape comprising an elongate flexible body having a pulling eye catch on an end thereof, wherein the body passes through the opening of the storage reel and the pulling eye catch is configured to extend from each opening, wherein the fish tape is configured to contact the blocking wall.

20. The assembly of claim 19, wherein the fish tape further comprises an enlarged end at a second end thereof, wherein the body is spooled with the pulling eye catch on an inner diameter of a coil and the enlarged end on an outer diameter of the coil, wherein the enlarged end is configured to engage with the blocking wall.

\* \* \* \* \*

UNITED STATES PATENT AND TRADEMARK OFFICE
CERTIFICATE OF CORRECTION

| | |
|---|---|
| PATENT NO. | : 11,964,844 B2 |
| APPLICATION NO. | : 17/753404 |
| DATED | : April 23, 2024 |
| INVENTOR(S) | : Kroening et al. |

It is certified that error appears in the above-identified patent and that said Letters Patent is hereby corrected as shown below:

In the Claims

In Column 21, Claim 17, Lines 34-35, delete "through which the fish tape"

Signed and Sealed this
Fourth Day of June, 2024

Katherine Kelly Vidal
*Director of the United States Patent and Trademark Office*